US011073895B2

(12) United States Patent
Park et al.

(10) Patent No.: US 11,073,895 B2
(45) Date of Patent: Jul. 27, 2021

(54) DISPLAY APPARATUS HAVING TOUCH DRIVING CIRCUIT FOR GENERATING DRIVING SIGNALS FOR DIFFERENT LEVELS

(71) Applicants: Samsung Display Co., Ltd., Yongin-si (KR); Seoul National University R&DB Foundation, Seoul (KR)

(72) Inventors: Youngmin Park, Gwangmyeong-si (KR); Deog-kyoon Jeong, Seoul (KR); Kyungyoul Min, Hwaseong-si (KR); Jiheon Park, Seoul (KR); Jonghyun Oh, Seoul (KR); Moonsang Hwang, Seoul (KR); Young-Ha Hwang, Seoul (KR)

(73) Assignees: Samsung Display Co., Ltd., Yongin-si (KR); Seoul National University R&DB Foundation, Seoul (KR)

( * ) Notice: Subject to any disclaimer, the term of this patent is extended or adjusted under 35 U.S.C. 154(b) by 166 days.

(21) Appl. No.: 16/058,970

(22) Filed: Aug. 8, 2018

(65) Prior Publication Data

US 2019/0095032 A1 Mar. 28, 2019

(30) Foreign Application Priority Data

Sep. 25, 2017 (KR) .................. 10-2017-0123749

(51) Int. Cl.
*G06F 3/045* (2006.01)
*G06F 1/3234* (2019.01)
(Continued)

(52) U.S. Cl.
CPC .......... *G06F 1/3262* (2013.01); *G06F 3/0446* (2019.05); *G06F 3/04164* (2019.05); *G06F 3/04166* (2019.05); *G06F 2203/04112* (2013.01)

(58) Field of Classification Search
CPC ............... G06F 1/3262; G06F 3/044; G06F 2203/04112
(Continued)

(56) References Cited

U.S. PATENT DOCUMENTS

RE37,552 E 2/2002 Svensson et al.
9,846,502 B2 12/2017 Lee
(Continued)

FOREIGN PATENT DOCUMENTS

CN 106775126 5/2017
EP 3156884 4/2017
(Continued)

OTHER PUBLICATIONS

Extended European Search Report dated Dec. 21, 2018, in European Patent Application No. 18195835.6.

*Primary Examiner* — Jonathan M Blancha
(74) *Attorney, Agent, or Firm* — H.C. Park & Associates, PLC

(57) ABSTRACT

A display apparatus includes a display panel; a touch sensing unit (TSU) on the display panel and including first and second transmission touch lines (TTL); and a touch driving circuit (TDC). The TDC applies first and second touch driving signals (TDS) to the first and second TTL, respectively. The TDC includes first and second sharing switch devices (SSD) respectively connected to the first and second TTL. The first and second SSD are connected to each other. The first TDS has a first voltage level during a first period, and the second TDS has a second voltage level different than the first voltage level during the first period. The TDC is configured to turn on the first and second SSD during a second period after the first period such that the first and second TDSs have a voltage level between the first voltage level and the second voltage level.

19 Claims, 19 Drawing Sheets

(51) Int. Cl.
*G06F 3/041* (2006.01)
*G06F 3/044* (2006.01)

(58) Field of Classification Search
USPC .......................................................... 345/174
See application file for complete search history.

(56) References Cited

U.S. PATENT DOCUMENTS

| | | |
|---|---|---|
| 2015/0116263 A1 | 4/2015 | Kim |
| 2015/0179133 A1 | 6/2015 | Lee |
| 2015/0346887 A1* | 12/2015 | Cho ...................... G06F 1/3262 345/174 |
| 2016/0005363 A1* | 1/2016 | Van Lier .............. G09G 3/3466 345/212 |
| 2017/0090624 A1* | 3/2017 | Kwon ................... G06F 1/3262 |
| 2017/0090643 A1* | 3/2017 | Kim ...................... G06F 3/0412 |
| 2017/0108993 A1* | 4/2017 | Lee ..................... G06F 3/04166 |
| 2017/0242529 A1 | 8/2017 | Park et al. |
| 2018/0095597 A1* | 4/2018 | Kwon ................... G06F 3/0412 |

FOREIGN PATENT DOCUMENTS

| | | |
|---|---|---|
| KR | 10-2015-0060042 | 6/2015 |
| KR | 10-2017-0038606 | 4/2017 |
| KR | 10-1746022 | 6/2017 |

* cited by examiner

DISPLAY APPARATUS HAVING TOUCH DRIVING CIRCUIT FOR GENERATING DRIVING SIGNALS FOR DIFFERENT LEVELS

CROSS-REFERENCE TO RELATED APPLICATION

This application claims priority from and the benefit of Korean Patent Application No. 10-2017-0123749, filed Sep. 25, 2017, which is hereby incorporated by reference for all purposes as if fully set forth herein.

BACKGROUND

Field

Some exemplary embodiments generally relate to a display apparatus, and, more particularly, to a display apparatus including a touch driving circuit.

Discussion

Various display apparatuses, such as a television set, a mobile phone, a tablet computer, a navigation unit, a game unit, etc., which are applied to a multimedia device, have been developed. As an input device of a display apparatus, a keyboard or a mouse may be used, however, the display apparatuses include a touch panel as the input device. In general, a touch sensing function of the touch panel can be continuously activated while the display apparatus is turned on, and, as such, can consume a lot of power.

The above information disclosed in this section is only for understanding the background of the inventive concepts, and, therefore, may contain information that does not form prior art.

SUMMARY

Some exemplary embodiments provide a display apparatus including a touch driving circuit capable of improving power consumption.

Some exemplary embodiments provide a display apparatus including a display panel, a touch sensing unit, and a touch driving circuit.

Additional aspects will be set forth in the detailed description which follows, and, in part, will be apparent from the disclosure, or may be learned by practice of the inventive concepts.

According to some exemplary embodiments, a display apparatus includes a display panel, a touch sensing unit, and a touch driving circuit. The touch sensing unit is disposed on the display panel. The touch sensing unit includes a first transmission touch line and a second transmission touch line spaced apart from the first transmission touch line. The touch driving circuit is configured to: apply a first touch driving signal to the first transmission touch line; and apply a second touch driving signal to the second transmission touch line. The touch driving circuit includes: a first switch group including a first sharing switch device of which one end is connected to the first transmission touch line; and a second switch group including a second sharing switch device of which one end is connected to the second transmission touch line and another end is connected to another end of the first sharing switch device. The first touch driving signal has a first voltage level during a first period, and the second touch driving signal has a second voltage level different from the first voltage level during the first period. The touch driving circuit is configured to turn on the first sharing switch device and the second sharing switch device during a second period after the first period such that the first touch driving signal and the second touch driving signal have a voltage level between the first voltage level and the second voltage level.

According to some exemplary embodiments, a display apparatus including a display panel, a touch sensing unit, and a touch driving circuit. The touch sensing unit is disposed on the display panel. The touch sensing unit includes a transmission touch line. The touch driving circuit is configured to: receive a driving voltage and a ground voltage; and apply a touch driving signal to the transmission touch line. The touch driving circuit includes: a switch group including switch devices, the switch devices including first ends connected to the transmission touch line; and capacitor devices each being connected to second ends of some switch devices of the switch devices. The touch driving signal has N voltage levels, a number of the capacitor devices is N−3, and "N" is a natural number greater than or equal to 4.

According to some exemplary embodiments, a display apparatus includes a display panel, a touch sensing unit, and a touch driving circuit. The touch sensing unit is disposed on the display panel. The touch sensing unit includes a first transmission touch line and a second transmission touch line spaced apart from the first transmission touch line. The touch driving circuit is configured to: apply a first touch driving signal to the first transmission touch line; and apply a second touch driving signal to the second transmission touch line. The touch driving circuit includes: a first switch group including a first sharing switch device of which a first end is connected to the first transmission touch line; and a second switch group including a second sharing switch device of which a first end is connected to the second transmission touch line and a second end is connected to a second end of the first sharing switch device. The touch driving circuit is configured to: turn on the first sharing switch device and the second sharing switch device during a first period such that the first touch driving signal and the second touch driving signal have a first voltage level; and turn on the first sharing switch device and the second sharing switch device during a second period different from the first period such that the first touch driving signal and the second touch driving signal have a second voltage level different from the first voltage level.

According to some exemplary embodiments, a display apparatus includes a display panel, a touch sensing unit, and a touch driving circuit. The touch sensing unit is disposed on the display panel. The touch sensing unit includes a first transmission touch line and a second transmission touch line spaced apart from the first transmission touch line. The touch driving circuit is configured to: apply a first touch driving signal to the first transmission touch line; and apply a second touch driving signal to the second transmission touch line. The first touch driving signal and the second touch driving signal have first to n-th voltage levels that sequentially increase, "n" being an odd number greater than or equal to 3. Each of the first touch driving signal and the second touch driving signal has an $((n+1)/2)$-th voltage level during a first period. The first touch driving signal has an $((n+3)/2)$-th voltage level during a second period after the first period. The second touch driving signal has an $((n-1)/2)$-th voltage level during the second period after the first period.

According to various exemplary embodiments, a touch driving circuit may apply a touch driving signal, which includes stepwise increasing or decreasing portions, to transmission touch lines, and, as such, power consumption of a touch sensing unit may be reduced. In addition, the number of capacitors can be reduced in the touch driving circuit that generates the touch driving signal, and, in this manner, manufacturing cost and time may be reduced.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
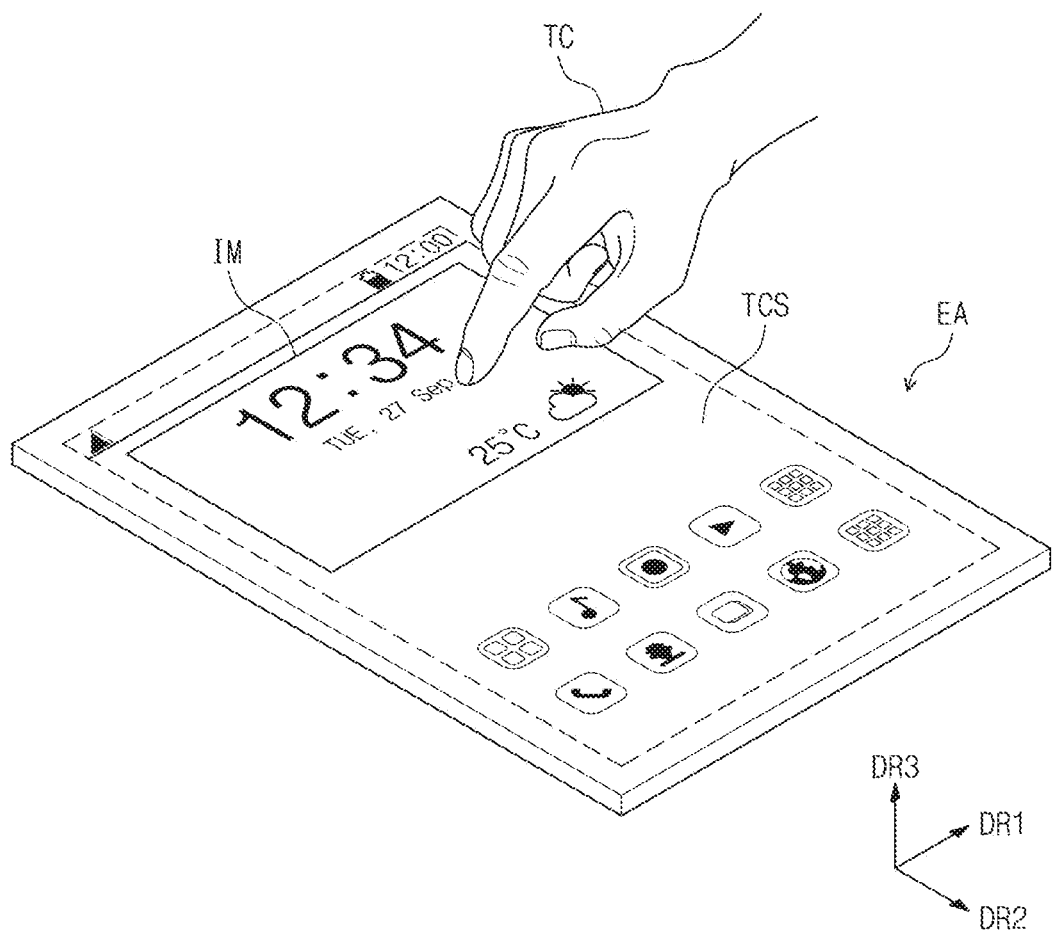
FIG. 1 is a perspective view showing a display apparatus according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the spirit and the scope of the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection. Further, the D1-axis, the D2-axis, and the D3-axis are not limited to three axes of a rectangular coordinate system, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the spirit and scope of the inventive concepts. Further, the blocks, units, and/or modules of some exemplary embodiments may be physically combined into more complex blocks, units, and/or modules without departing from the spirit and scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a perspective view showing a display apparatus according to some exemplary embodiments.

Referring to FIG. 1, a display apparatus EA may be, but is not limited to, a touch screen apparatus. The touch screen apparatus may be at least one of a smartphone, a tablet personal computer, a mobile phone, an electronic book (e-book) reader, a notebook computer, a personal digital assistant (PDA), a portable multimedia player (PMP), an MP3 player, a mobile medical device, a camera, and a wearable display device; however, exemplary embodiments are not limited thereto.

The display apparatus EA provides a touch screen surface TCS. The touch screen surface TCS corresponds to an outermost surface of the display apparatus EA, is exposed to the outside to provide a user with an image (e.g., image IM), and corresponds to a target surface for an external input TC.

The touch screen surface TCS displays the image IM to provide the user with information or to communicate with the user. In addition, the touch screen surface TCS senses the external input TC. In various exemplary embodiments, the external input TC indicates a user's hand, but it should not be limited to the user's hand. That is, the external input TC may be an input generated by a stylus pen or a hovering input depending on a sensing device included in the display apparatus EA.

The display apparatus EA may have various exteriors. As an example, the display apparatus EA may include short sides extending in a first direction DR1 and long sides extending in a second direction DR2. A third direction DR3 indicates a thickness direction of the display apparatus EA.

Figure 2:
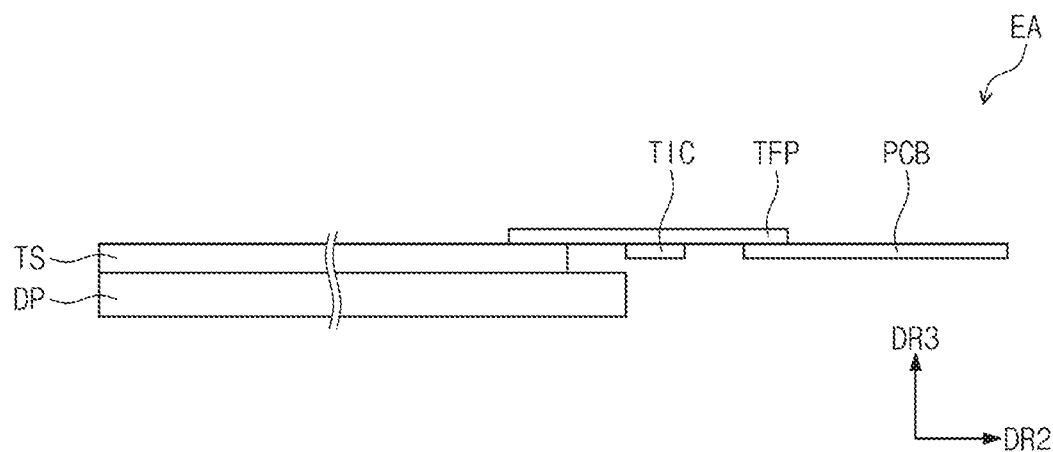
FIG. 2 is a cross-sectional view showing a display apparatus according to some exemplary embodiments.

FIG. 2 is a cross-sectional view showing the display apparatus EA according to some exemplary embodiments. That is, FIG. 2 shows a cross-section defined by the second direction DR2 and the third direction DR3.

The display apparatus EA includes a display panel DP, a touch sensing unit TS, a touch flexible printed circuit board (touch FPC) TFP, a touch driving chip TIC, and a printed circuit board PCB. Although not shown separately, the display apparatus EA may further include a protective member disposed under the display panel DP, an anti-reflection member, and/or a window member disposed on the touch sensing unit TS.

The display panel DP may display the image IM. The display panel DP may be one of an organic light emitting display panel, a liquid crystal display panel, a plasma display panel, an electrophoretic display panel, and an electrowetting display panel. Hereinafter, the organic light emitting display panel will be described as the display panel DP.

The touch sensing unit TS obtains coordinate information about the external input TC. The touch sensing unit TS is disposed on the display panel DP. The touch sensing unit TS may be provided as an independent module and attached to the display panel DP by an adhesive layer. According to some exemplary embodiments, the touch sensing unit TS may be attached to the display panel DP without using a separate adhesive and formed through consecutive processes of the display panel DP. For example, the touch sensing unit TS may be grown on (or as part of) a layer of the display panel DP.

The touch sensing unit TS may have a multi-layer structure. The touch sensing unit TS may include a single conductive layer or a plurality of conductive layers. The touch sensing unit TS may include a single insulating layer or a plurality of insulating layers.

The touch FPC TFP is electrically connected to the touch sensing unit TS. The touch FPC TFP includes lines to electrically connect the touch driving chip TIC to the touch sensing unit TS. The touch FPC TFP includes a flexible material, and thus, the touch FPC TFP may be bent. The touch FPC TFP is downwardly bent, and thus, the printed circuit board PCB is disposed on a rear side of the display panel DP. In FIG. 2, the touch FPC TFP is attached to an upper surface of the touch sensing unit TS, but it should not be limited thereto or thereby. For instance, the touch FPC TFP may be attached to the display panel DP, and the display panel DP may be electrically connected to the touch sensing unit TS.

The touch driving chip TIC may be mounted on the touch FPC TFP, but it should not be limited thereto or thereby. According to some exemplary embodiments, the touch driving chip TIC may be mounted on the display panel DP. The touch driving chip TIC may include at least a portion of a touch driving circuit. The touch driving circuit includes a plurality of electronic devices and lines. The touch driving circuit provides a touch driving signal to drive the touch sensing unit TS and receives a sensing signal from the touch sensing unit TS. The touch driving circuit includes a switching device and generates the touch driving signal having a plurality of levels, the details of which will be described later.

The printed circuit board PCB is connected to the touch FPC TFP. The printed circuit board PCB may receive the sensing signal from the touch driving chip TIC and provide a power voltage to generate the touch driving signal.

Although not shown in the figures, the display apparatus EA may further include a flexible printed circuit board connected to the display panel DP. The flexible printed circuit board may provide a signal to drive the display panel DP.

Figure 3:
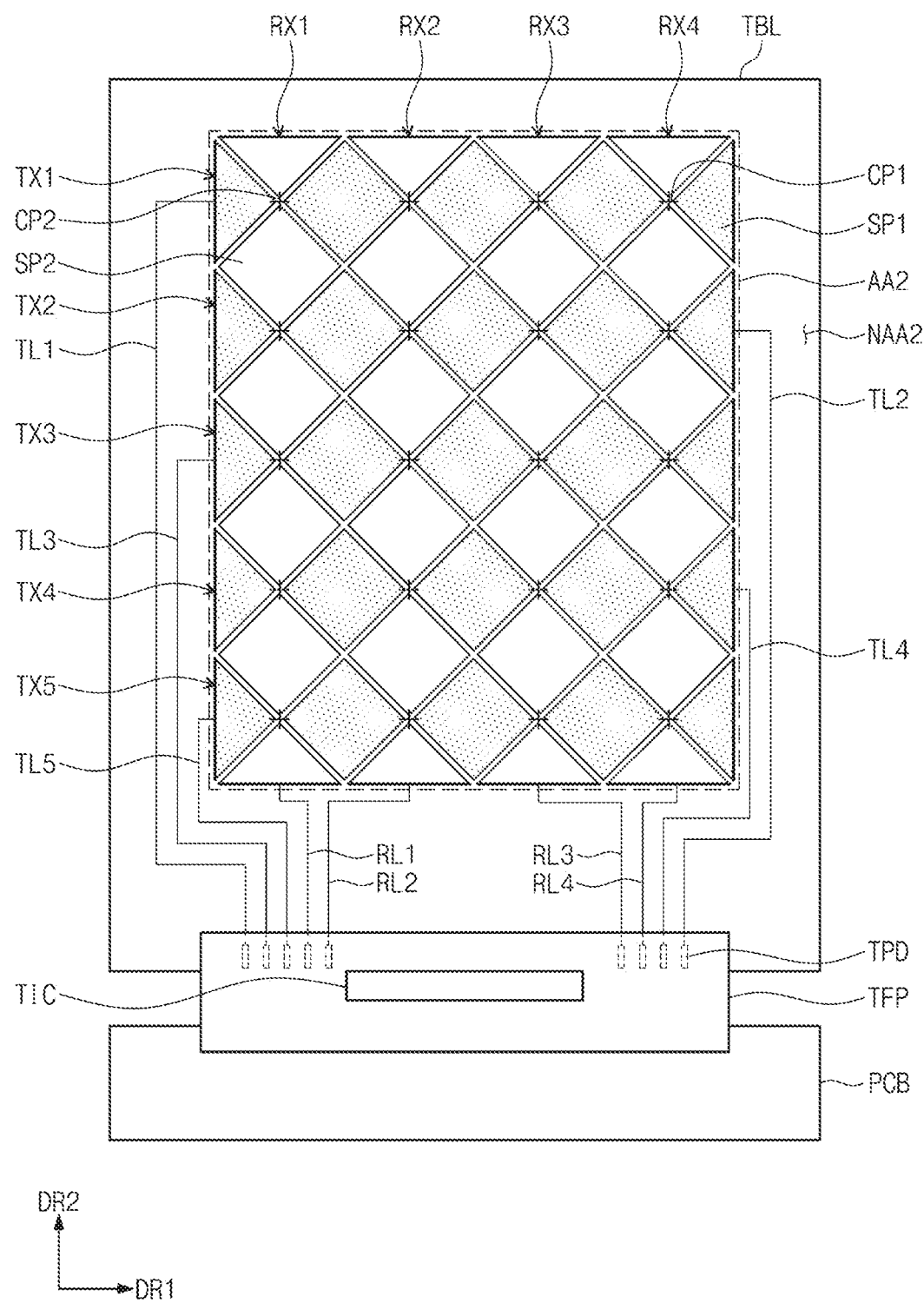
FIG. 3 is a plan view showing a touch flexible printed circuit board on which a touch sensing unit and a touch driving chip shown in FIG. 2 are mounted according to some exemplary embodiments.

FIG. 3 is a plan view showing a touch flexible printed circuit board on which a touch sensing unit and a touch driving chip shown in FIG. 2 are mounted according to some exemplary embodiments.

The touch sensing unit TS may be implemented in an electrostatic capacitance manner. The touch sensing unit TS may be operated in one of a manner that extracts (or otherwise determines) touch coordinates based on a variation in capacitance of a capacitor formed by two touch lines extending in different directions from each other and insulated from each other, and a manner that extracts (or otherwise determines) the touch coordinates based on a variation in capacitance of a capacitor formed by touch electrodes arranged in an active area. In the following exemplary embodiments, the touch sensing unit TS operated in the former manner will be described as a representative example.

The touch sensing unit TS may be divided into an active area AA2 and a peripheral area NAA2. The touch sensing unit TS senses a touch input in the active area AA2 and does not sense the touch input in the peripheral area NAA2.

The touch sensing unit TS may include a base layer TBL, transmission touch lines TX1 to TX5, sensing touch lines RX1 to RX4, transmission lines TL1 to TL5, sensing lines RL1 to RL4, and touch pads TPD.

Each of the transmission touch lines TX1 to TX5 includes a plurality of transmission touch sensor parts SP1 and a plurality of first connection parts CP1. The transmission touch sensor parts SP1 are arranged in the first direction DR1. Each of the first connection parts CP1 connects two transmission touch sensor parts SP1 adjacent to each other among the transmission touch sensor parts SP1. Although not shown in the figures, each of the transmission touch sensor parts SP1 may have a mesh shape through which openings are defined.

The sensing touch lines RX1 to RX4 are insulated from the transmission touch lines TX1 to TX5 while crossing the transmission touch lines TX1 to TX5. Each of the sensing touch lines RX1 to RX4 includes a plurality of sensing touch sensor parts SP2 and a plurality of second connection parts CP2. The sensing touch sensor parts SP2 are arranged in the second direction DR2. Each of the second connection parts CP2 connects two sensing touch sensor parts SP2 adjacent to each other among the sensing touch sensor parts SP2. Although not shown in the figures, each of the sensing touch sensor parts SP2 may have a mesh shape through which openings are defined.

In some exemplary embodiments, the transmission touch sensor parts SP1 and the first connection parts CP1 are disposed on a first layer, and the sensing touch sensor parts SP2 and the second connection parts CP2 are disposed on a second layer different from the first layer. According to another exemplary embodiment, the transmission touch sensor parts SP1, the first connection parts CP1, and the sensing touch sensor parts SP2 may be disposed on the first layer, and the second connection parts SP2 may be disposed on the second layer different from the first layer, or vice versa.

The transmission touch lines TX1 to TX5 and the sensing touch lines RX1 to RX4 form touch capacitors. The touch sensing unit TS may sense touch input coordinates based on a variation of the touch capacitors.

One ends (or first ends) of the transmission lines TL1 to TL5 may be connected to the transmission touch lines TX1 to TX5. The other ends (or second ends) of the transmission lines TL1 to TL5 may be connected to the touch pads TPD. The transmission lines TL1 to TL5 may apply the touch driving signal received from the touch driving chip TIC through the touch pads TPD to the transmission touch lines TX1 to TX5.

One ends (or first ends) of the sensing lines RL1 to RL4 may be connected to the sensing touch lines RX1 to RX4. The other ends (or second ends) of the sensing lines RL1 to RL4 may be connected to the touch pads TPD. The sensing lines RL1 to RL4 may apply the sensing signals from the sensing touch lines RX1 to RX4 to the touch driving chip TIC through the touch pads TPD.

Figure 4:
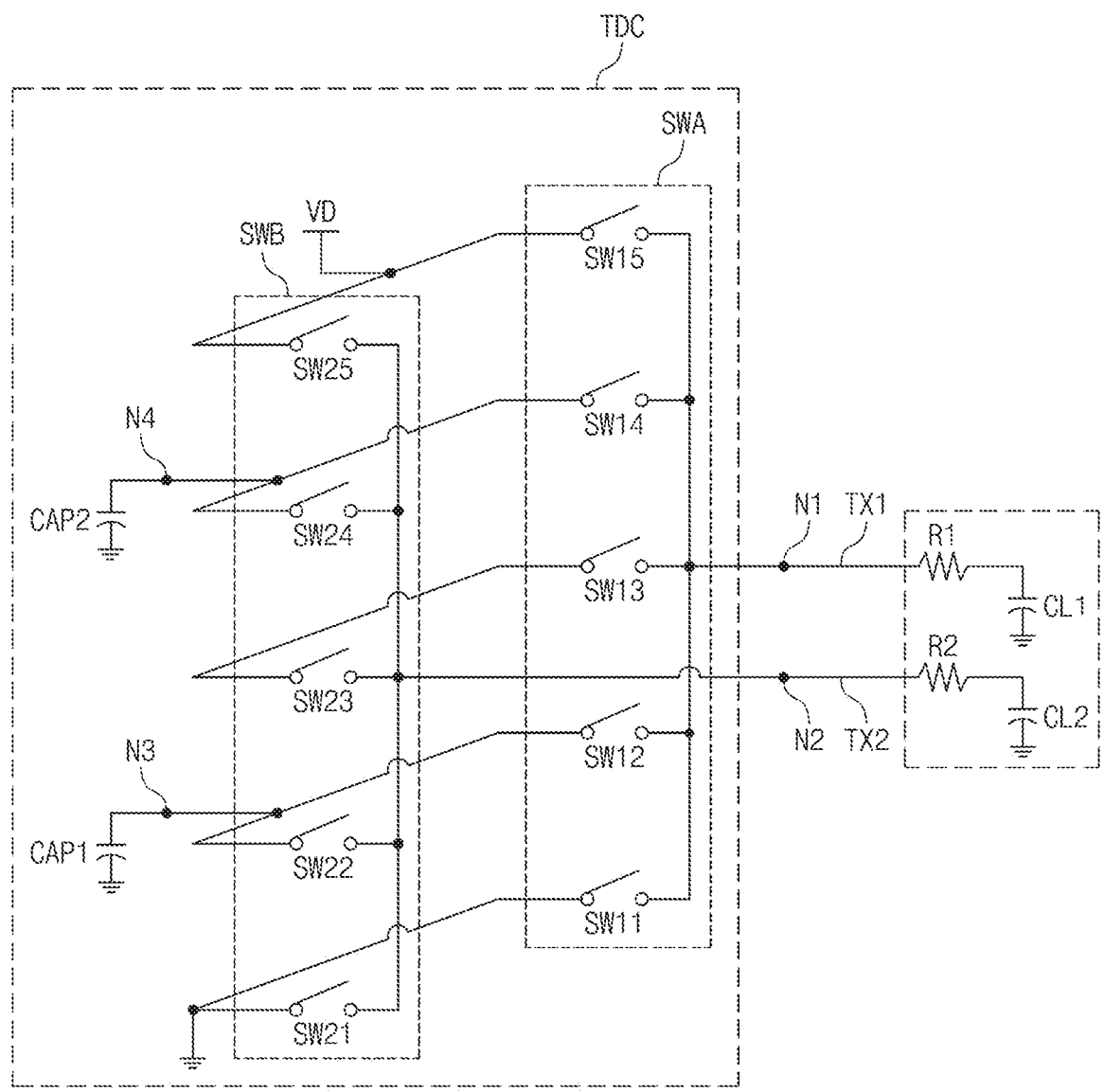
FIG. 4 is a circuit diagram showing a touch driving circuit and transmission touch lines according to some exemplary embodiments.

FIG. 4 is a circuit diagram showing a touch driving circuit and transmission touch lines according to some exemplary embodiments.

That is, FIG. 4 shows first and second transmission touch lines TX1 and TX2 among the transmission touch lines, and a portion of the touch driving circuit TDC that drives the two transmission touch lines TX1 and TX2 as a representative example. Although not shown in the figures, the touch driving circuits TDC respectively connected to the transmission touch lines TX1 to TX5 of FIG. 3 have the same circuit configuration as that of the touch driving circuit TDC shown in FIG. 4.

In FIG. 4, the first transmission touch line TX1 is modeled with an equivalent circuit that includes a first resistor R1 and a first load capacitor CL1. The first resistor R1 may indicate a line resistance of the first transmission touch line TX1, and the first load capacitor CL1 may indicate a capacitor formed by a line and an electrode around the line (e.g., an upper cathode electrode of an organic light emitting display panel). Similarly, the second transmission touch line TX2 is modeled with an equivalent circuit that includes a second resistor R2 and a second load capacitor CL2.

The touch driving circuit TDC may include switch groups SWA and SWB electrically and respectively connected to the transmission touch lines TX1 and TX2 and capacitor devices CAP1 and CAP2.

The touch driving circuit TDC receives a driving voltage VD from an external source, for example, the printed circuit board PCB of FIG. 2, and is grounded. The touch driving circuit TDC receives the driving voltage VD and generates the touch driving signal having a plurality of voltage levels using the switch groups SWA and SWB and the capacitor devices CAP1 and CAP2.

The touch driving circuit TDC generates a first touch driving signal, which is provided to the first transmission touch line TX1 and a second touch driving signal, which is provided to the second transmission touch line TX2. The first touch driving signal may be a signal measured at a first node N1 of FIG. 4 and may be measured at an output terminal of the touch driving chip TIC of FIG. 2. The second touch driving signal may be a signal measured at a second node N2 of FIG. 4 and may be measured at an output terminal of the touch driving chip TIC of FIG. 2.

Hereinafter, the touch driving circuit TDC that generates the touch driving signal having four voltage levels will be described in detail as a representative example.

The switch groups SWA and SWB include a first switch group SWA connected to the first transmission touch line TX1, and a second switch group SWB connected to the second transmission touch line TX2. The switch groups SWA and SWB may be included in the touch driving chip TIC of FIG. 2.

The first switch group SWA and the second switch group SWB may be independently controlled from each other. The switch devices included in the switch groups SWA and SWB may be implemented in (or as) transistors.

The capacitor devices CAP1 and CAP2 may include a first capacitor device CAP1 and a second capacitor device CAP2. The first and second capacitor devices CAP1 and CAP2 have a capacitance greater than that of the first and second load capacitors CL1 and CL2 of the first and second transmission touch lines TX1 and TX2. The capacitor devices CAP1 and CAP2 may be included in the touch driving chip TIC of FIG. 2 and/or may be included in the printed circuit board PCB of FIG. 2.

In order to receive the driving voltage VD and generate N voltage levels, the number of the switch devices included in each of the switch groups SWA and SWB may be "N+1", and the number of the capacitor devices may be "N−2," with N being an integer greater than zero. Detailed descriptions of the above will be described later.

The first switch group SWA may include first, second, third, fourth, and fifth switch devices SW11, SW12, SW13, SW14, and SW15. One end (or a first end) of each of the first to fifth switch devices SW11 to SW15 may be connected to the first transmission touch line TX1. The other end (or second end) of the first switch device SW11 is connected to a ground terminal. The first switch device SW11 may be referred to as a "first ground switch device." The other (or second) end of the second switch device SW12 is connected to one electrode of the first capacitor device CAP1. The second switch device SW12 may be referred to as a "first lower switch device." The other (or second) end of the third switch device SW13 is connected to the other (or second) end of an eighth switch device SW23. The third switch device SW13 may be referred to as a "first sharing switch device." The other (or second) end of the fourth switch device SW14 is connected to one electrode of the second capacitor device CAP2. The fourth switch device SW14 may be referred to as a "first upper switch device." The other (or second) end of the fifth switch device SW15 receives the driving voltage VD. The fifth switch device SW15 may be referred to as a "first driving switch device,"

The second switch group SWB includes sixth, seventh, eighth, ninth, and tenth switch devices SW21, SW22, SW23, SW24, and SW25. One end (or a first end) of each of the sixth to tenth switch devices SW21 to SW25 is connected to the second transmission touch line TX2, and the other (or second) end of each of the sixth to tenth switch devices SW21 to SW25 is connected to the other end of each of the first to fifth switch devices SW11 to SW15. The other (or second) end of the sixth switch device SW21 is connected to the ground terminal. The sixth switch device SW21 may be referred to as a "second ground switch device." The other (or second) end of the seventh switch device SW22 is connected to the one electrode of the first capacitor device CAP1. The seventh switch device SW22 may be referred to as a "second lower switch device." The other (or second) end of the eighth switch device SW23 is connected to the other end of the third switch device SW13. The eighth switch device SW23 may be referred to as a "second sharing switch device." The other (or second) end of the ninth switch device SW24 is connected to the one electrode of the second capacitor device CAP2. The ninth switch device SW24 may be referred to as a "second upper switch device." The other (or second) end of the tenth switch device SW25 receives the driving voltage VD. The tenth switch device SW25 may be referred to as a "second driving switch device."

The one electrode of the first capacitor device CAP1 is connected to the other end of the second switch device SW12 and the other end of the seventh switch device SW22, and the other electrode of the first capacitor device CAP1 is connected to the ground terminal. The one electrode of the second capacitor device CAP2 is connected to the other end of the fourth switch device SW14 and the other end of the ninth switch device SW24, and the other electrode of the second capacitor device CAP2 is connected to the ground terminal.

FIGS. 5A, 5B, 5C, 5D, 5E, 5F, 5G, 5H, and 5I are views sequentially showing operational processes of the touch driving circuit of FIG. 4 used to generate a touch driving signal having a plurality of voltage levels according to some exemplary embodiments. FIG. 6 is waveform diagram showing switching signals applied to first to tenth switching devices and a touch driving signal according to some exemplary embodiments.

The switch signals include first to fifth switch signals SG11 to SG15 and sixth to tenth switch signals SG21 to SG25 respectively applied to the first to fifth switch devices SW11 to SW15 and the sixth to tenth switch devices SW21 to SW25. The first to fifth switch devices SW11 to SW15 and the sixth to tenth switch devices SW21 to SW25 may be turned on during a period in which the first to fifth switch signals SG11 to SG15 and the sixth to tenth switch signals SG21 to SG25 have a high level, and the first to fifth switch devices SW11 to SW15 and the sixth to tenth switch devices SW21 to SW25 may be turned off during a period in which the first to fifth switch signals SG11 to SG15 and the sixth to tenth switch signals SG21 to SG25 have a low level.

In the following descriptions, the touch driving circuit TDC generates a first touch driving signal SG1 applied to the first transmission touch line TX1 and generates a second touch driving signal SG2 applied to the second transmission touch line TX2. The first touch driving signal SG1 and the second touch driving signal SG2 may have different phases from each other. For instance, the first touch driving signal SG1 and the second touch driving signal SG2 may have opposite phases to each other, e.g., 180° out of phase from each other.

The first and second touch driving signals SG1 and SG2 may be a step-shaped signal that repeatedly rises and falls. In some exemplary embodiments, the first and second touch driving signals SG1 and SG2 repeatedly rise and fall between a first level V1 that is a ground voltage level, and a fifth level V5 that is a voltage level of the driving voltage VD. To this end, the first, second, third, fourth, and fifth switch devices SW11, SW12, SW13, SW14, and SW15 are turned on sequentially or in reverse order, and sixth, seventh, eighth, ninth, and tenth switch devices SW21, SW22, SW23, SW24, and SW25 are turned on sequentially or in reverse order. FIG. 6 shows the first and second touch driving signals SG1 and SG2 in analog voltage form by taking into account a delay occurring in a portion of the first and second touch driving signals SG1 and SG2.

Figure 5A:
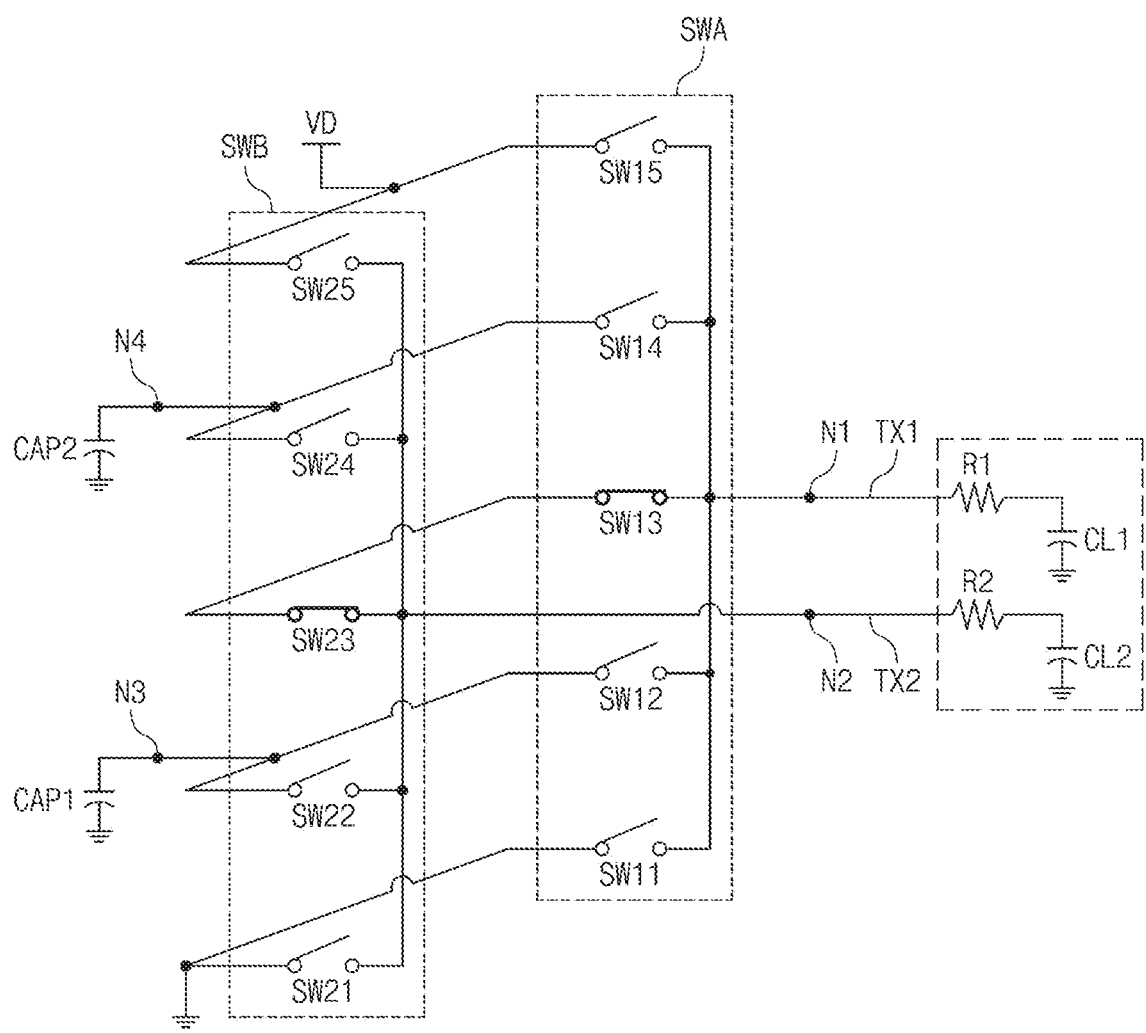
FIGS. 5A, 5B, 5C, 5D, 5E, 5F, 5G, 5H, and 5I are views sequentially showing operational processes of the touch driving circuit of FIG. 4 used to generate a touch driving signal having a plurality of voltage levels according to some exemplary embodiments.
Figure 6:
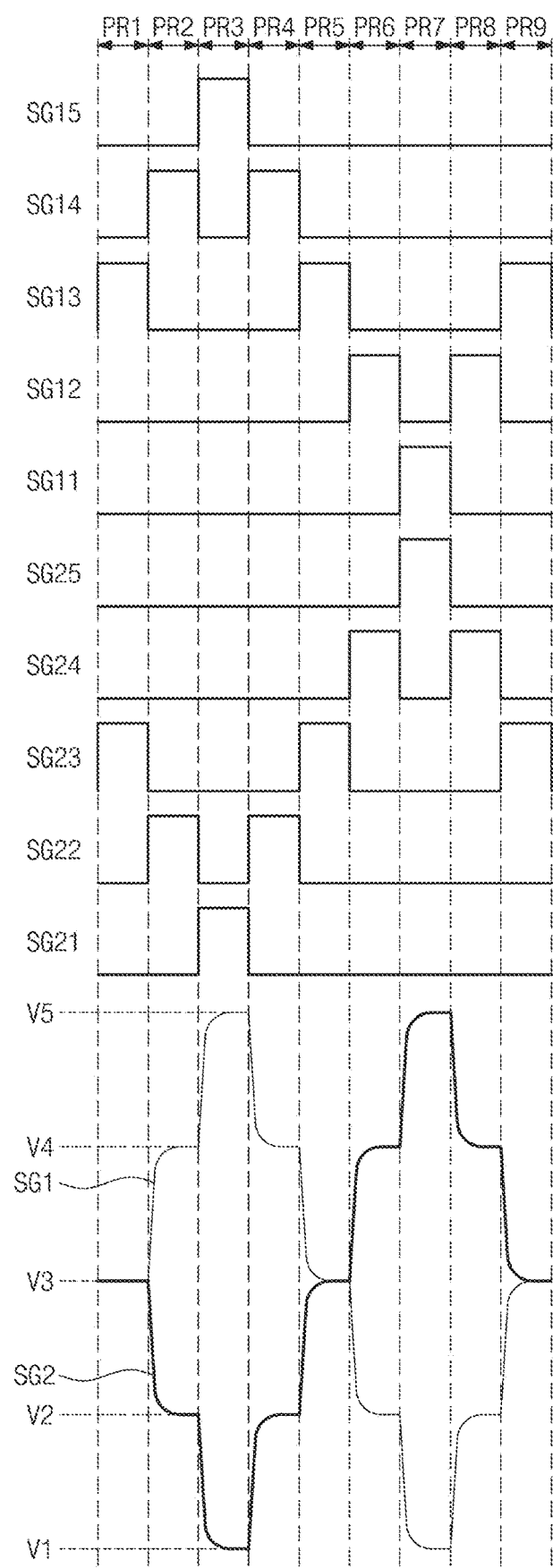
FIG. 6 is waveform diagram showing switching signals applied to first to tenth switching devices and a touch driving signal according to some exemplary embodiments.

Referring to FIGS. 5A and 6, the third switch device SW13 is turned on in response to a third switch signal SG13 during a first period PR1, and the eighth switch device SW23 is turned on in response to an eighth switch signal SG23 during the first period PR1. The other switch devices SW11, SW12, SW14, SW15, SW21, SW22, SW24, and SW25 are turned off during the first period PR1.

The first load capacitor CL1 of the first transmission touch line TX1 shares electric charges with the second load capacitor CL2 of the second transmission touch line TX2, and a voltage level of the first touch driving signal SG1 becomes equal to a voltage level of the second touch driving signal SG2. During the first period PR1, the first touch driving signal SG1 and the second touch driving signal SG2 may have a third level V3. The third level V3 may be approximate to an intermediate value between the first level V1 and the fifth level V5.

Figure 5B:
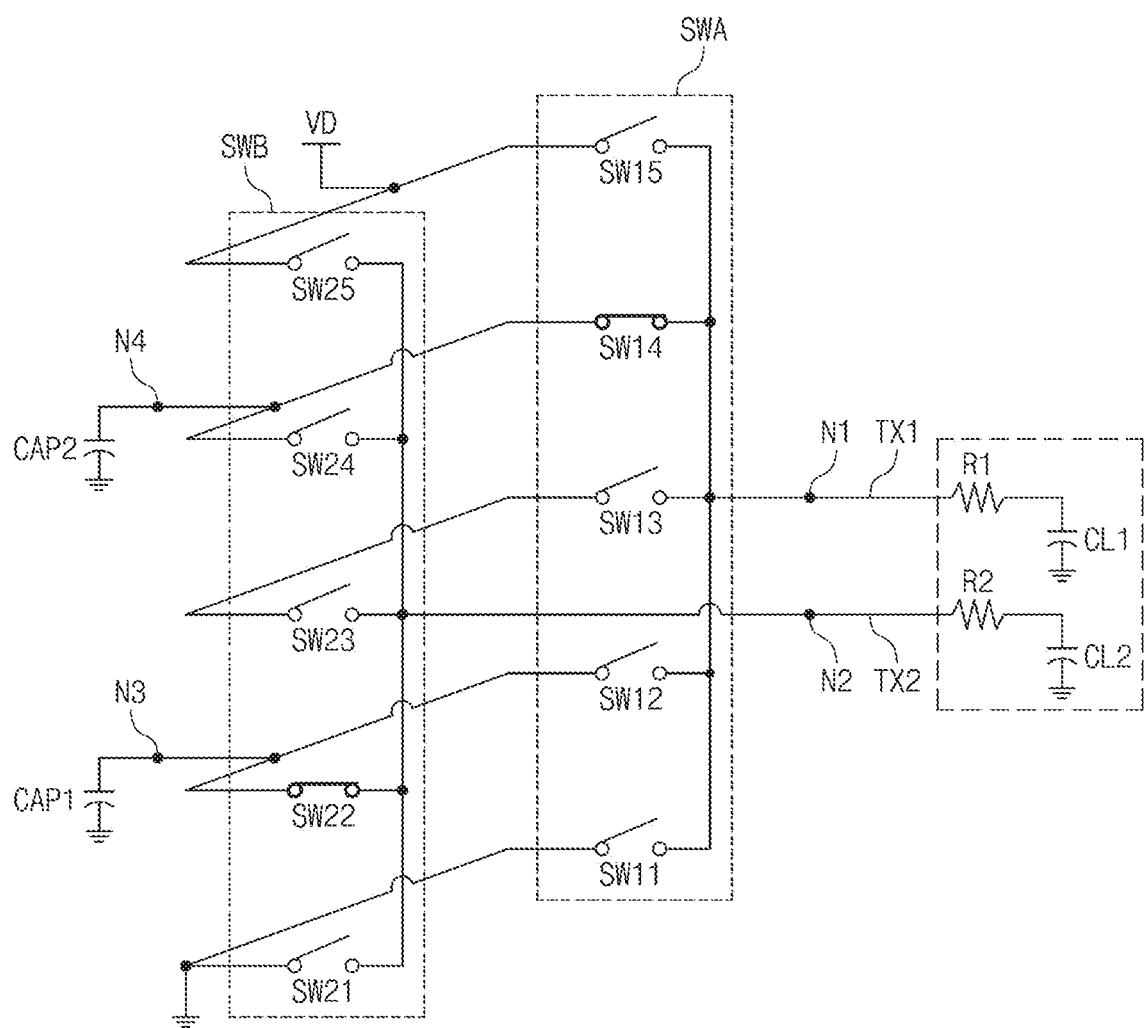

Referring to FIGS. 5B and 6, the fourth switch device SW14 is turned on in response to a fourth switch signal SG14 during a second period PR2, and the seventh switch device SW22 is turned on in response to a seventh switch signal SG22 during the second period PR2. The other switch devices SW11, SW12, SW13, SW15, SW21, SW23, SW24, and SW25 are turned off during the second period PR2.

An electric potential of a third node N3 to which the one electrode of the first capacitor device CAP1 is connected may have a second level V2. In addition, an electric potential of a fourth node N4 to which the one electrode of the second capacitor device CAP2 is connected may have a fourth level V4.

A voltage level of the first touch driving signal SG1 corresponds to the third level V3 right after the first period PR1, and a voltage level of the fourth node N4 corresponds to the fourth level V4 right after the first period PR1. The first load capacitor CL1 is charged with electric charges charged in the second capacitor CAP2 during the second period PR2, and thus, the voltage level of the first touch driving signal SG1 increases to the fourth level V4. Since the capacitance of the second capacitor device CAP2 is set to be at least ten to hundred times greater than that of the first load capacitor CL1, a variation in voltage level of the fourth node N4 is very small even though the first load capacitor CL1 is charged with the electric charges. As such, the variation in voltage level of the fourth node N4 may be disregarded.

A voltage level of the second touch driving signal SG2 corresponds to the third level V3 right after the first period PR1, and a voltage level of the third node N3 corresponds to the second level V2 right after the first period PR1. The first capacitor device CAP1 discharges the second load capacitor CL2 during the second period PR2, and thus, the voltage level of the second touch driving signal SG2 reaches the second level V2. Since the capacitance of the first capacitor device CAP1 is set to be at least ten to hundred times greater than that of the second load capacitor CL2, a variation in voltage level of the third node N3 is very small even though the electric charges in the second load capacitor CL2 are discharged. As such, the variation in voltage level of the third node N3 may be disregarded.

Figure 5C:
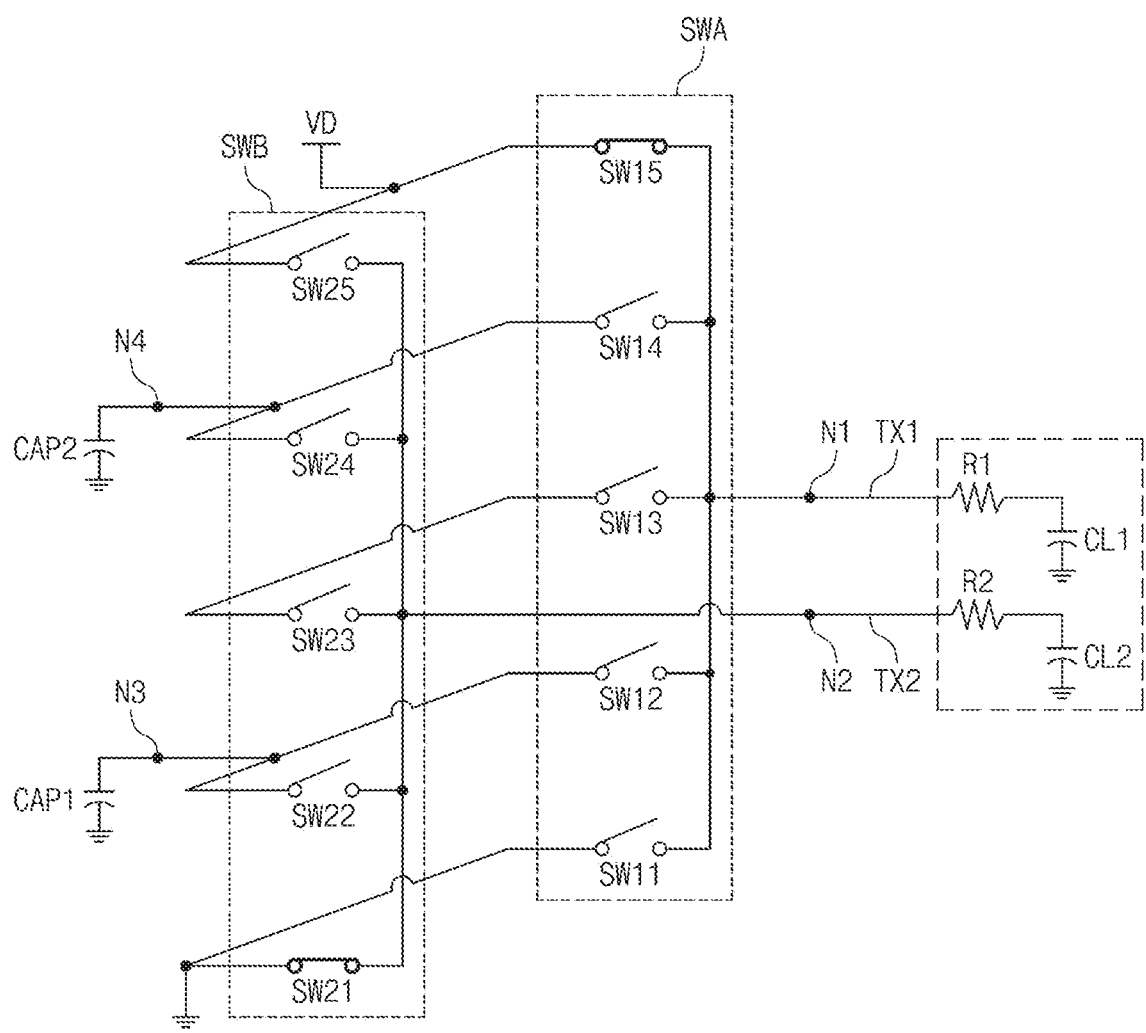

Referring to FIGS. 5C and 6, the fifth switch device SW15 is turned on in response to a fifth switch signal SG15 during a third period PR3, and the sixth switch device SW21 is turned on in response to a sixth switch signal SG21 during the third period PR3. The other switch devices SW11, SW12, SW13, SW14, SW22, SW23, SW24, and SW25 are turned off during the third period PR3.

During the third period PR3, the voltage level of the first touch driving signal SG1 reaches the fifth level V5 by the driving voltage VD. The voltage level of the second touch driving signal SG2 reaches the first level V1 by the ground voltage during the third period PR3.

Figure 5D:
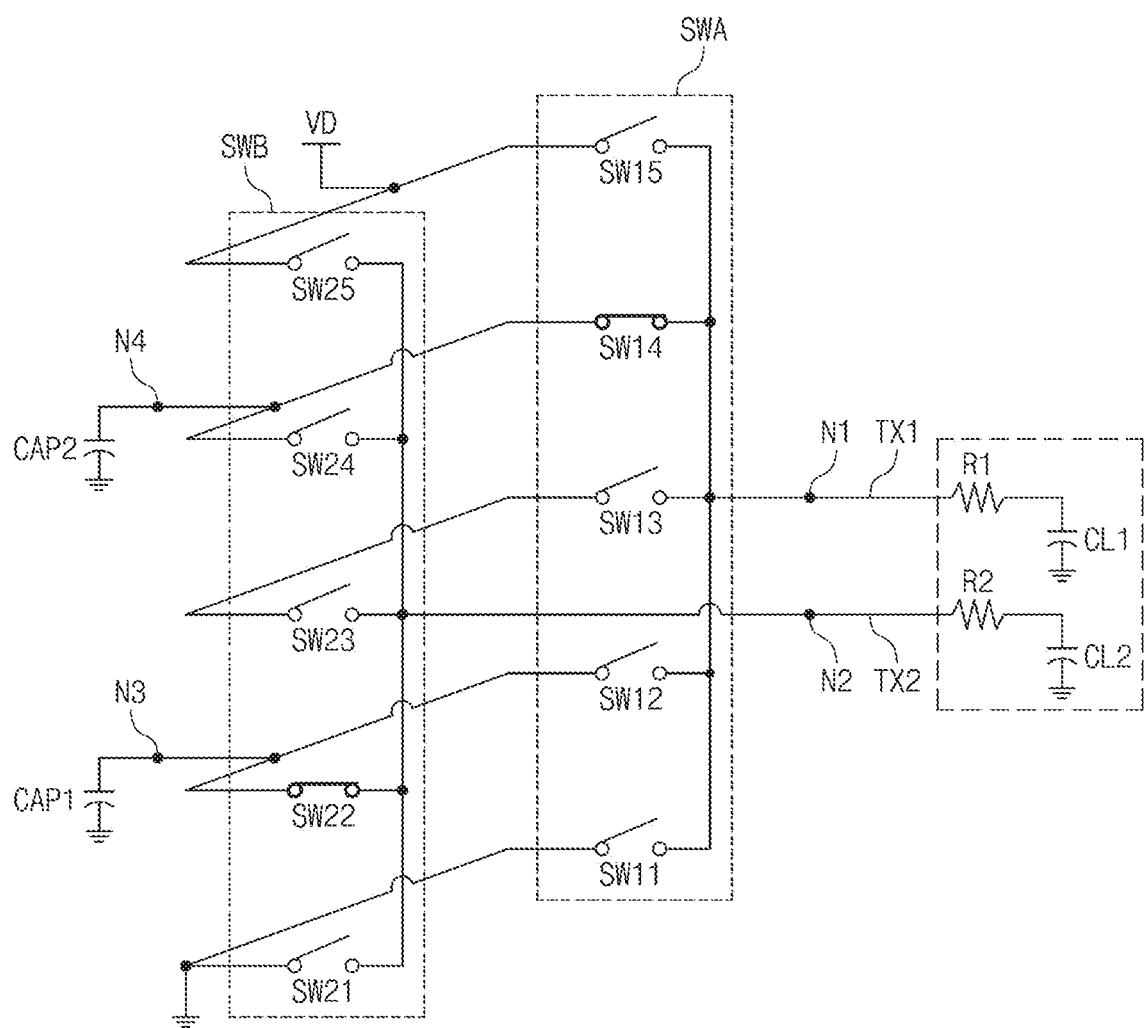

Referring to FIGS. 5D and 6, the fourth switch device SW14 is turned on in response to the fourth switch signal SG14 during a fourth period PR4, and the seventh switch device SW22 is turned on in response to the seventh switch signal SG22 during the fourth period PR4. The other switch devices SW11, SW12, SW13, SW15, SW21, SW23, SW24, and SW25 are turned off during the fourth period PR4.

The voltage level of the first touch driving signal SG1 corresponds to the fifth level V5 right after the third period PR3, and the voltage level of the fourth node N4 corresponds to the fourth level V4 right after the third period PR3.

During the fourth period PR4, the second capacitor device CAP2 discharges the first load capacitor CL1, and thus, the first touch driving signal SG1 reaches the fourth level V4.

The voltage level of the second touch driving signal SG2 corresponds to the first level V1 right after the third period PR3, and the voltage level of the third node N3 corresponds to the second level V2 right after the third period PR3. During the fourth period PR4, the first capacitor device CAP1 charges the second load capacitor CL2, and thus, the second touch driving signal SG2 reaches the second level V2.

Figure 5E:
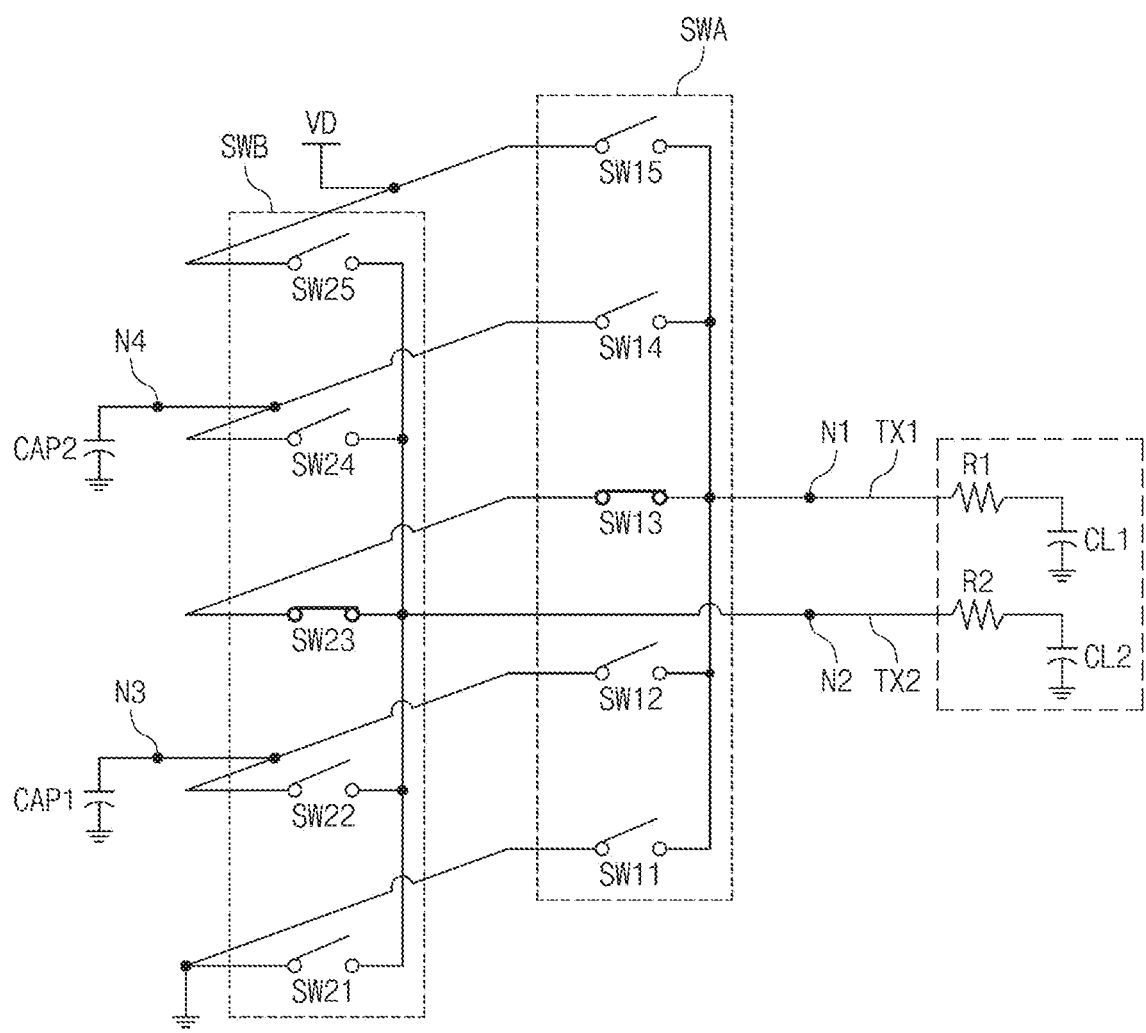

Referring to FIGS. 5E and 6, the third switch device SW13 is turned on in response to the third switch signal SG13 during a fifth period PR5, and the eighth switch device SW23 is turned on in response to the eighth switch signal SG23 during the fifth period PR5. The other switch devices SW11, SW12, SW14, SW15, SW21, SW22, SW24, and SW25 are turned off during the fifth period PR5.

The first load capacitor CL1 of the first transmission touch line TX1 shares electric charges with the second load capacitor CL2 of the second transmission touch line TX2, and the voltage level of the first touch driving signal SG1 becomes equal to the voltage level of the second touch driving signal SG2. During the fifth period PR5, the first touch driving signal SG1 and the second touch driving signal SG2 may have the third level V3. The third level V3 may approximate to the intermediate value between the first level V1 and the fifth level V5.

Figure 5F:
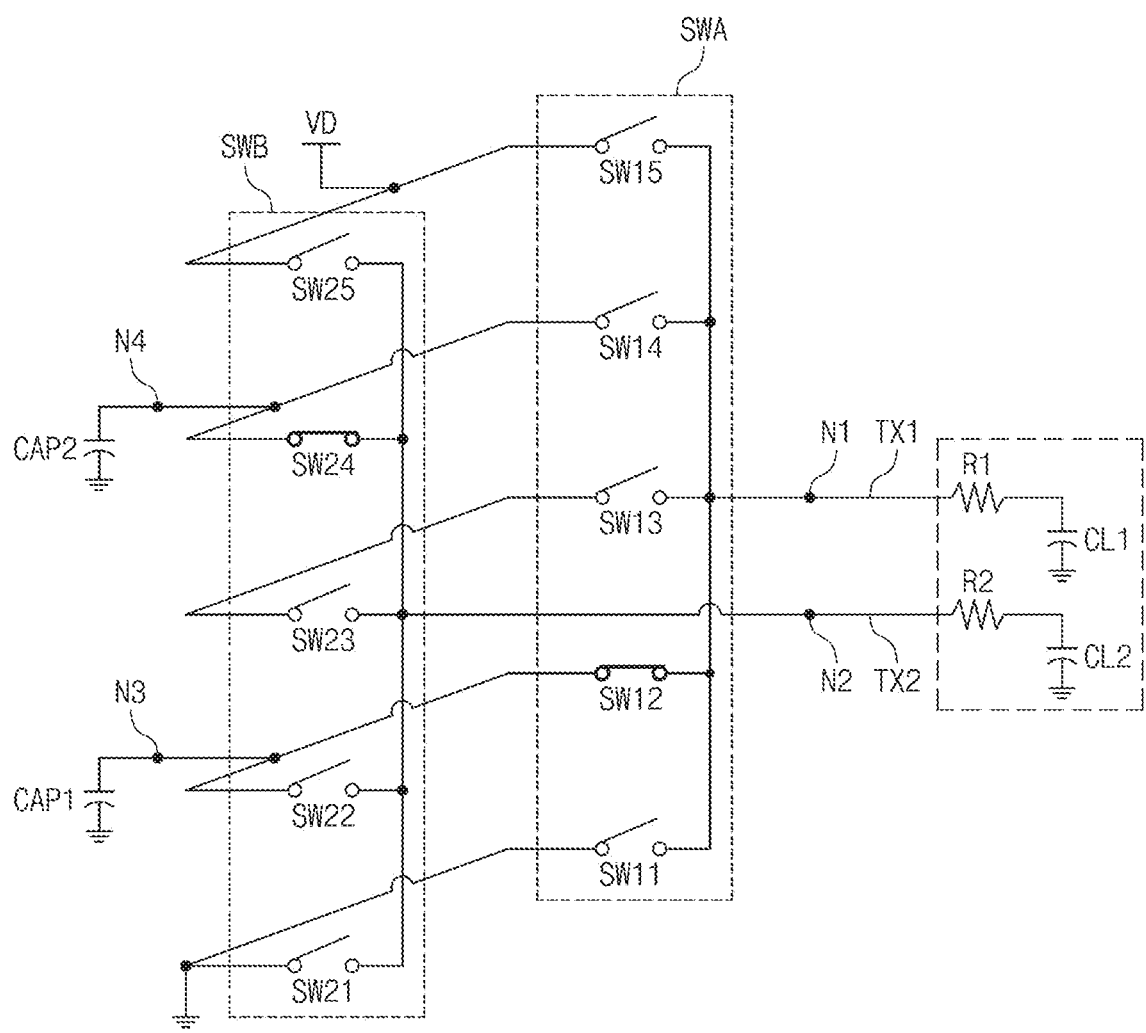

Referring to FIGS. 5F and 6, the second switch device SW12 is turned on in response to the second switch signal SG12 during a sixth period PR6, and the ninth switch device SW24 is turned on in response to a ninth switch signal SG24 during the sixth period PR6. The other switch devices SW11, SW13, SW14, SW15, SW21, SW22, SW23, and SW25 are turned off during the sixth period PR6.

The voltage level of the first touch driving signal SG1 corresponds to the third level V3 right after the fifth period PR5, and the voltage level of the third node N3 corresponds to the second level V2 right after the fifth period PR5. During the sixth period PR6, the first capacitor device CAP1 discharges the first load capacitor CL1, and thus, the first touch driving signal SG1 reaches the second level V2.

The voltage level of the second touch driving signal SG2 corresponds to the third level V3 right after the fifth period PR5, and the voltage level of the fourth node N4 corresponds to the fourth level V4 right after the fifth period PR5. During the sixth period PR6, the second capacitor device CAP2 charges the second load capacitor CL2, and thus, the second touch driving signal SG2 reaches the fourth level V4.

Figure 5G:
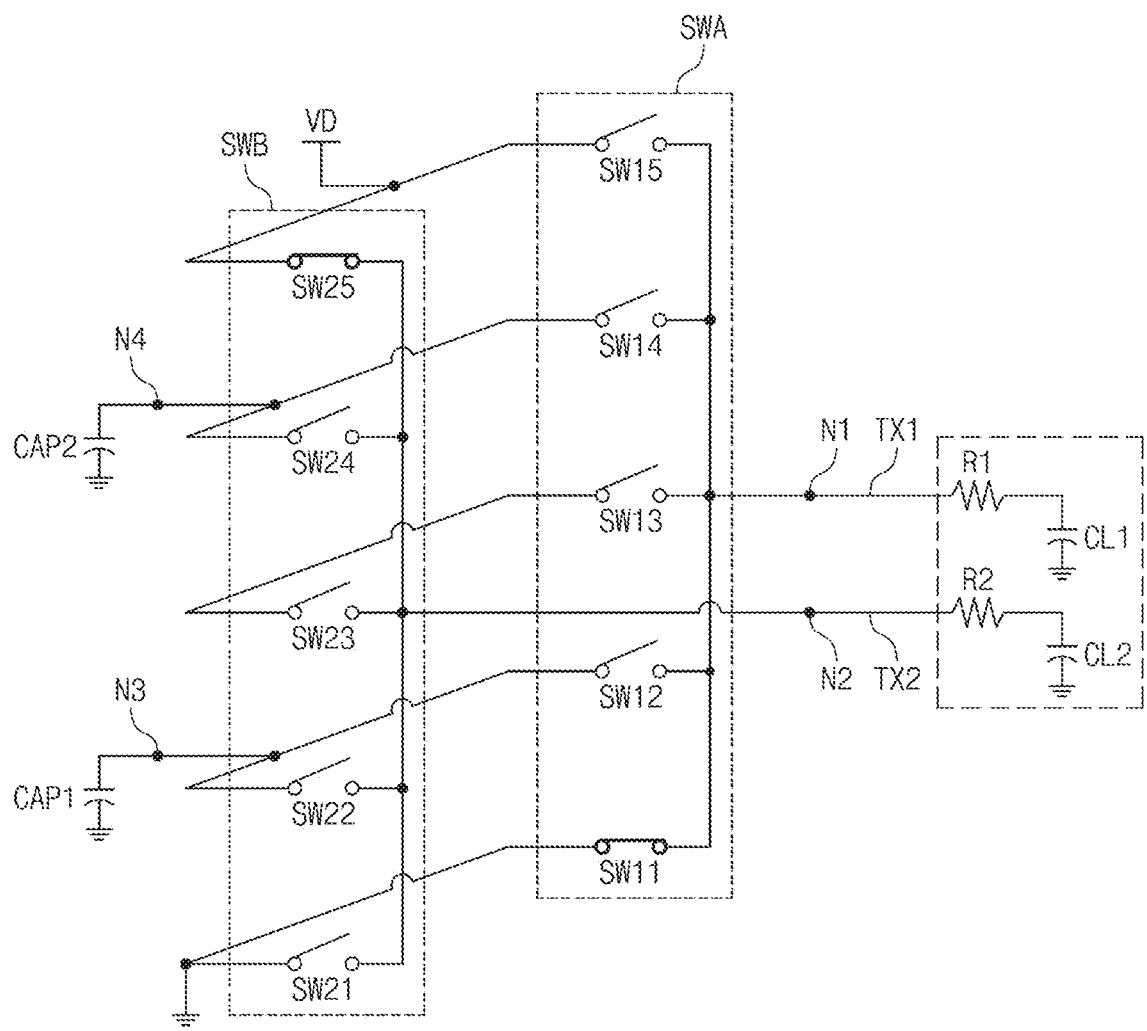

Referring to FIGS. 5G and 6, the first switch device SW11 is turned on in response to the first switch signal SG11 during a seventh period PR7, and the tenth switch device SW25 is turned on in response to a tenth switch signal SG25 during the seventh period PR7. The other switch devices SW12, SW13, SW14, SW15, SW21, SW22, SW23, and SW24 are turned off during the seventh period PR7.

During the seventh period PR7, the voltage level of the first touch driving signal SG1 reaches the first level V1 by the ground voltage. During the seventh period PR7, the voltage level of the second touch driving signal SG2 reaches the fifth level V5 by the driving voltage VD.

Figure 5H:
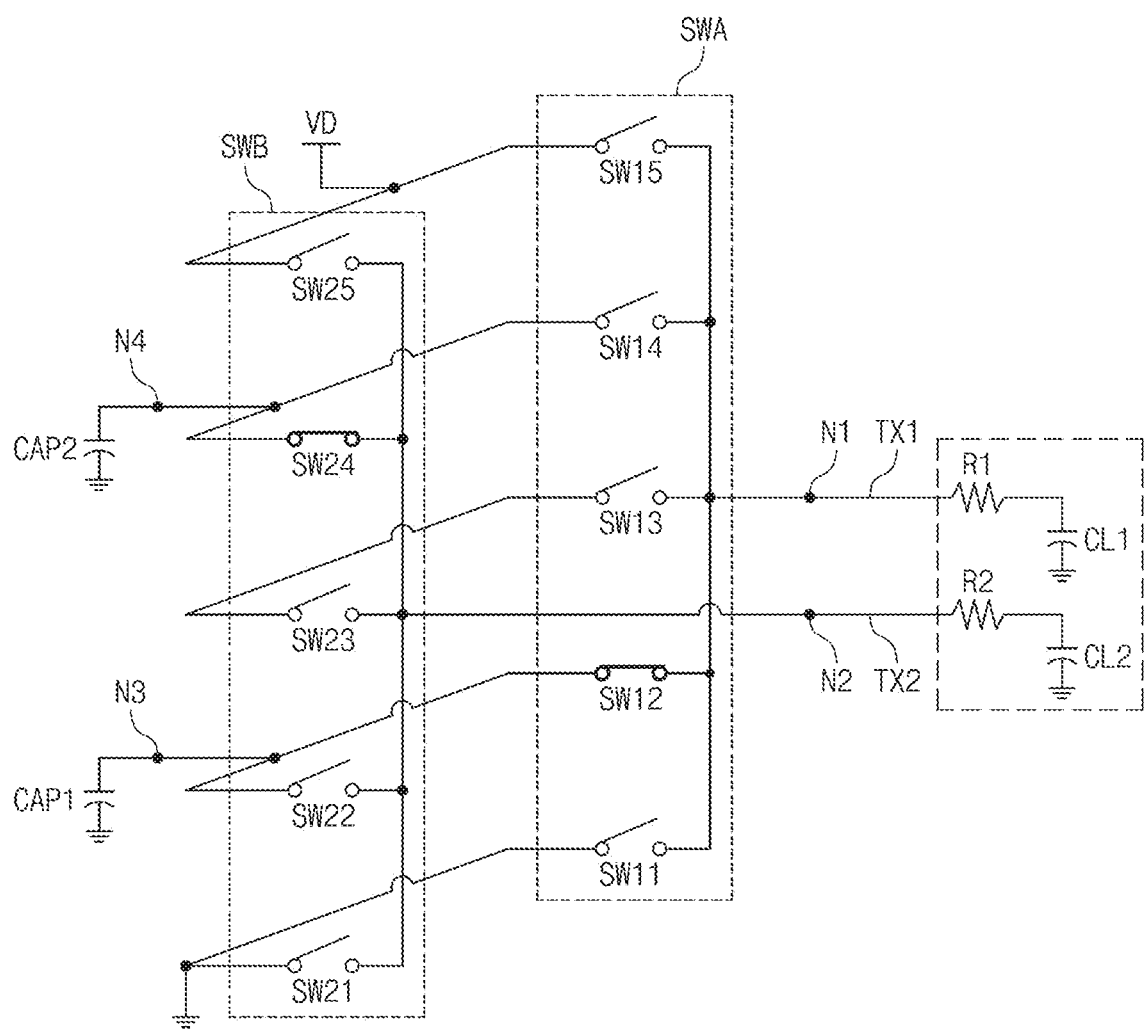

Referring to FIGS. 5H and 6, the second switch device SW12 is turned on in response to the second switch signal SG12 during an eighth period PR8, and the ninth switch device SW24 is turned on in response to the ninth switch signal SG24 during the eighth period PR8. The other switch devices SW11, SW13, SW14, SW15, SW21, SW22, SW23, and SW25 are turned off during the eight period PR8.

The voltage level of the first touch driving signal SG1 corresponds to the first level V1 right after the seventh period PR7, and the voltage level of the third node N3 corresponds to the second level V2 right after the seventh period PR7. During the eighth period PR8, the first capacitor device CAP1 charges the first load capacitor CL1, and thus, the first touch driving signal SG1 reaches the second level V2.

The voltage level of the second touch driving signal SG2 corresponds to the fifth level V5 right after the seventh period PR7, and the voltage level of the fourth node N4 corresponds to the fourth level V4 right after the seventh period PR7. During the eighth period PR8, the second capacitor device CAP2 discharges the second load capacitor CL2, and thus, the second touch driving signal SG2 reaches the fourth level V4.

Figure 5I:
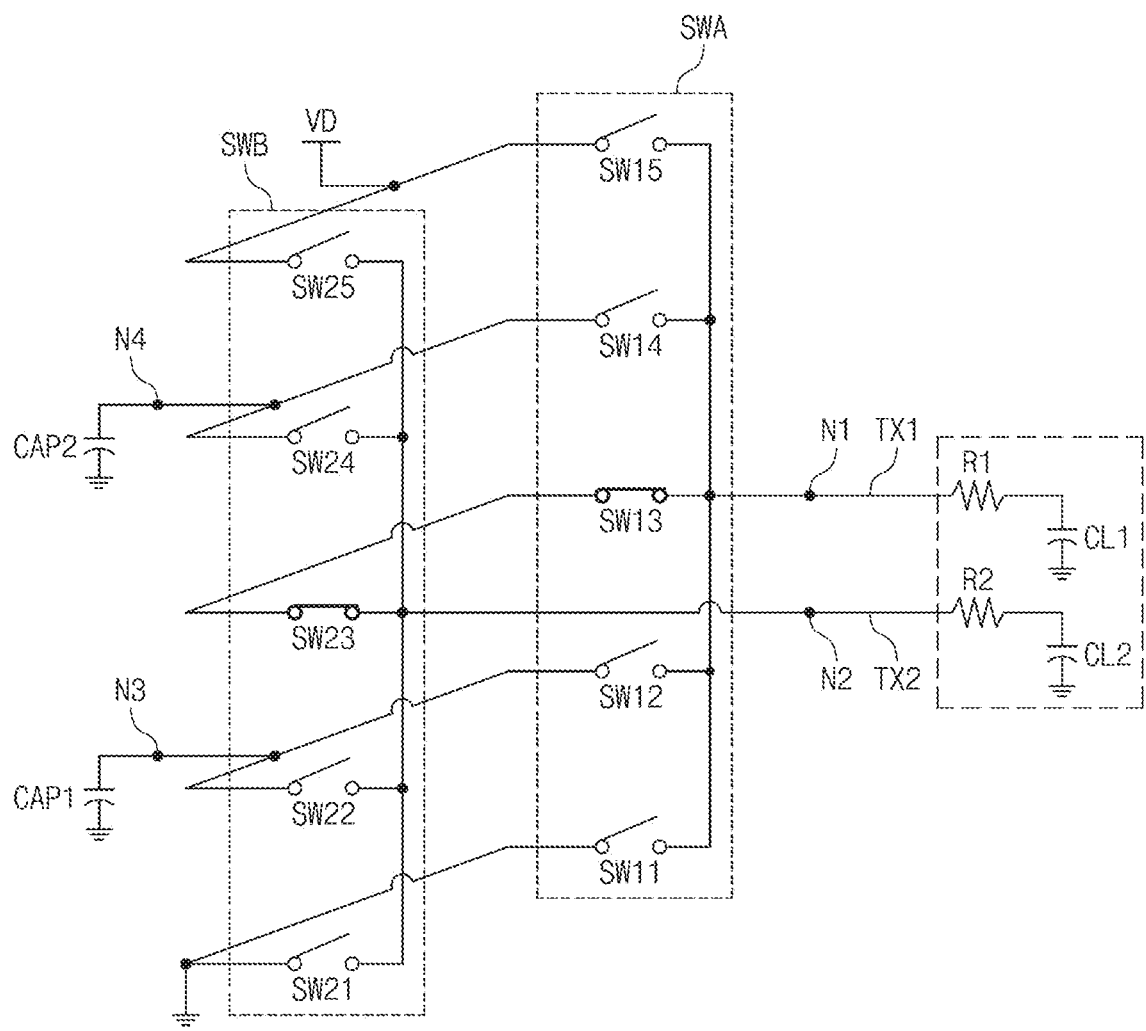

Referring to FIGS. 5I and 6, the third switch device SW13 is turned on in response to the third switch signal SG13 during a ninth period PR9, and the eighth switch device SW23 is turned on in response to the eighth switch signal SG23 during the ninth period PR9. The other switch devices SW11, SW12, SW14, SW15, SW21, SW22, SW24, and SW25 are turned off during the ninth period PR9.

The first load capacitor CL1 of the first transmission touch line TX1 shares electric charges with the second load capacitor CL2 of the second transmission touch line TX2, and the voltage level of the first touch driving signal SG1 becomes equal to the voltage level of the second touch driving signal SG2. During the ninth period PR9, the first touch driving signal SG1 and the second touch driving signal SG2 may have the third level V3. The third level V3 may approximate to the intermediate value between the first level V1 and the fifth level V5.

The touch driving circuit TDC may generate the first and second touch driving signals SG1 and SG2 corresponding to one cycle by sequentially running processes as exemplarily shown in FIGS. 5A to 5I.

In the above description, the first touch driving signal SG1 and the second touch driving signal SG2 have opposite phases to each other, but they are not limited thereto or thereby. That is, since the first switch group SWA and the second switch group SWB may be independently controlled from each other, the first touch driving signal SG1 and the second touch driving signal SG2 may have the same phase as each other or opposite phases to each other.

In a case that the electric charges in the transmission touch lines are not shared during a specific period, at least N−2 capacitor devices are used to generate the touch driving signal having the N voltage levels. According to some exemplary embodiments, N−3 capacitor devices (e.g., two capacitor devices as described herein) are used to generate the touch driving signal having the N voltage levels (e.g., the first to fifth levels V1 to V5 as exemplarily described herein) by sharing the electric charges of the transmission touch lines during the specific period. In this case, the "N" may be a natural number equal to or greater than 4.

Since the capacitor device has a relatively large capacitance, the capacitor device occupies a large area, a degree of freedom in designing decreases due to the large area, and a manufacturing cost increases. According to various exemplary embodiments, the number of capacitor devices may be reduced. Thus, the manufacturing cost may be reduced, and the degree of freedom in designing may be improved.

Figure 7A:
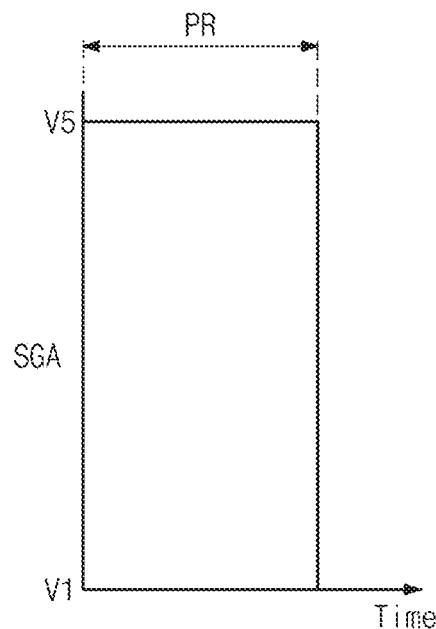
FIG. 7A is a view showing a waveform of a touch driving signal during a reference period according to a comparative example.
Figure 7B:
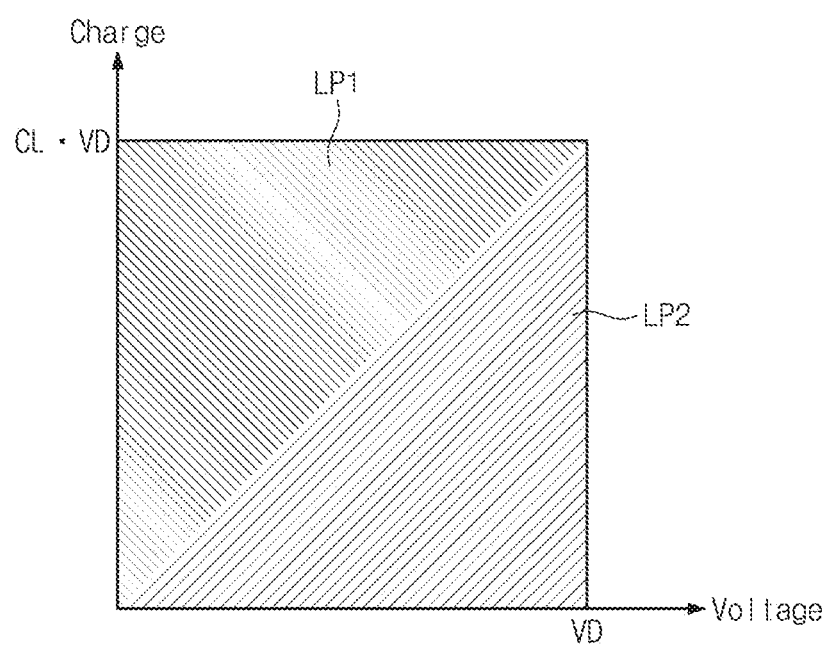
FIG. 7B is a view showing a loss amount of electric charges in a transmission touch line due to the touch driving signal of FIG. 7A as a function of a charge amount of a load capacitor.
Figure 7C:
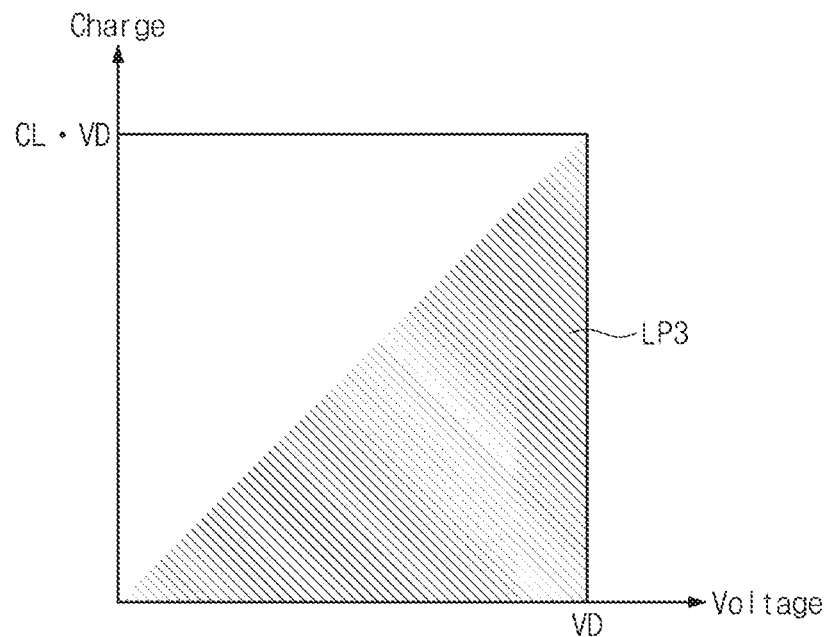
FIG. 7C is a view showing an amount of electric charges discharged from the load capacitor due to the touch driving signal of FIG. 7A.
Figure 7D:
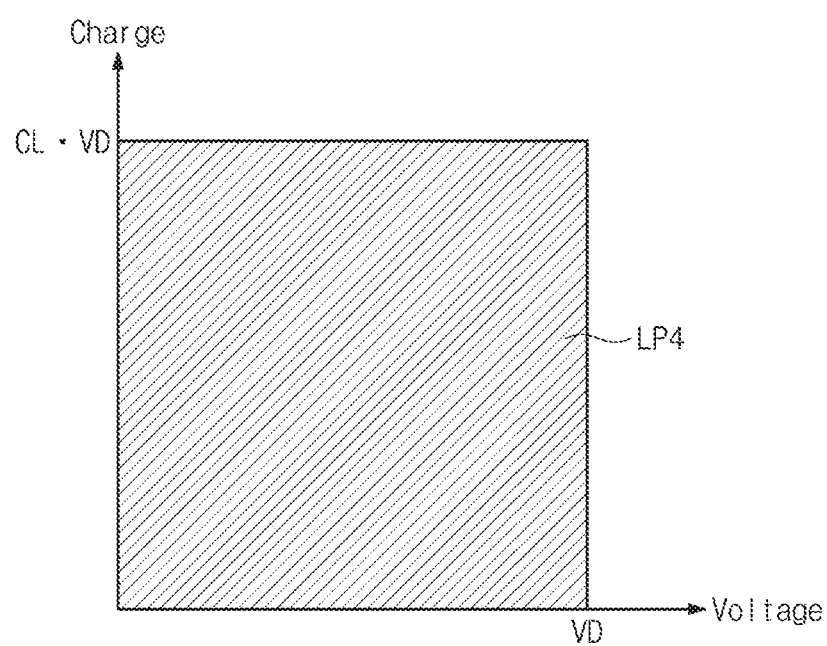
FIG. 7D is a view showing a sum of a loss amount of electric charges in the transmission touch line due to the touch driving signal of FIG. 7A and the amount of the electric charges discharged from the load capacitor.

FIG. 7A is a view showing a waveform of a touch driving signal during a reference period according to a comparative example. FIG. 7B is a view showing a loss amount of electric charges in a transmission touch line due to the touch driving signal of FIG. 7A as a function of a charge amount of a load capacitor. FIG. 7C is a view showing an amount of electric charges discharged from the load capacitor due to the touch driving signal of FIG. 7A. FIG. 7D is a view showing a sum of a loss amount of electric charges in the transmission touch line due to the touch driving signal of FIG. 7A and the amount of the electric charges discharged from the load capacitor.

The touch driving circuit according to the comparative example provides a square-wave voltage signal, which has a driving voltage as its highest level as shown in FIG. 7A, as a touch driving signal SGA without including the switch group and the capacitor device. In FIG. 7A, a first level V1 and a fifth level V5 are assumed to be the same as the first level V1 and the fifth level V5 shown in FIG. 6, respectively, and a reference period PR is assumed to be the same as the fourth period PR4 to the seventh period PR7 shown in FIG. 6.

Referring to FIGS. 7A and 7B, since the touch driving signal SGA has the fifth level V5 corresponding to the voltage level of the driving voltage VD and provides electric charges corresponding to "CL·VD" during the reference period PR, the transmission touch line of the comparative example consumes energy corresponding to "CL·VD2." Only an energy LP2 corresponding to "CL·VD2/2" is stored in the load capacitor, and the other energy LP1 corresponding to "CL·VD2/2" is lost due to a line resistance or the like of the transmission touch line.

Referring to FIGS. 7A and 7C, an energy LP3 corresponding to the "CL·VD2/2" stored in the load capacitor during the reference period PR may be discharged through a ground after the reference period PR. Referring to FIGS. 7A and 7D, a total energy LP4 lost by applying the touch driving signal having the driving voltage VD as its highest level to the transmission touch line during the reference period PR corresponds to "CL·VD2."

Figure 8A:
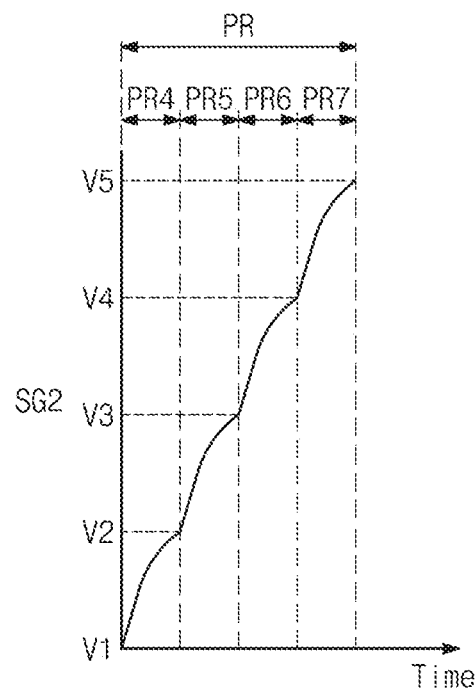
FIG. 8A is a view showing a waveform of a touch driving signal during a reference period according to some exemplary embodiments.
Figure 8B:
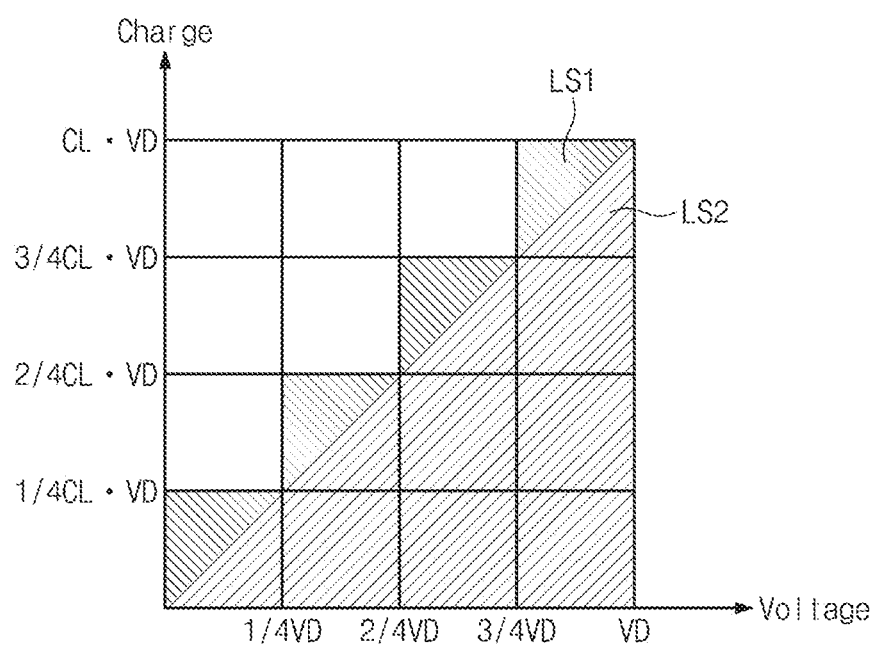
FIG. 8B is a view showing a loss amount of electric charges in a transmission touch line due to the touch driving signal of FIG. 8A as a function of a charge amount of a load capacitor according to some exemplary embodiments.
Figure 8C:
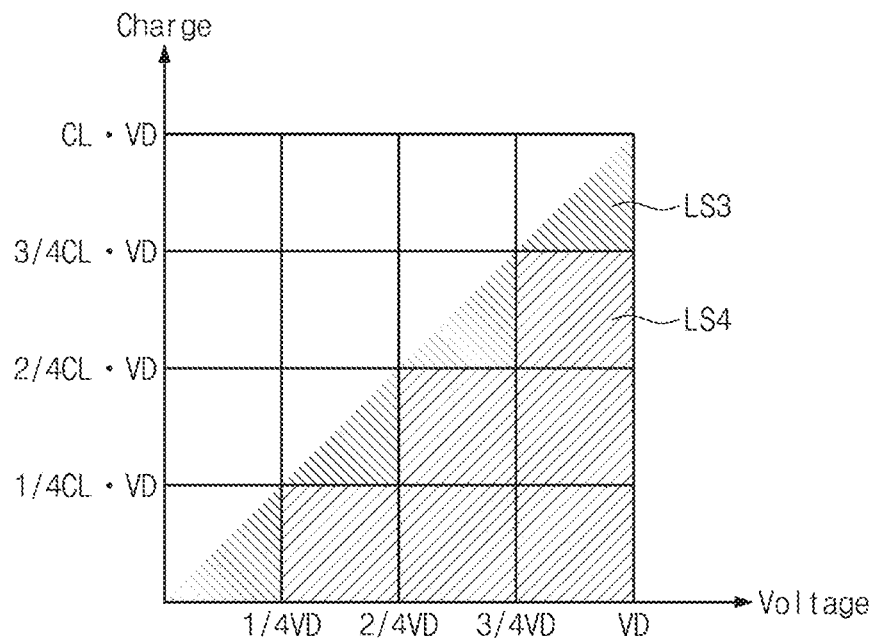
FIG. 8C is a view showing an amount of electric charges discharged from the load capacitor due to the touch driving signal of FIG. 8A according to some exemplary embodiments.
Figure 8D:
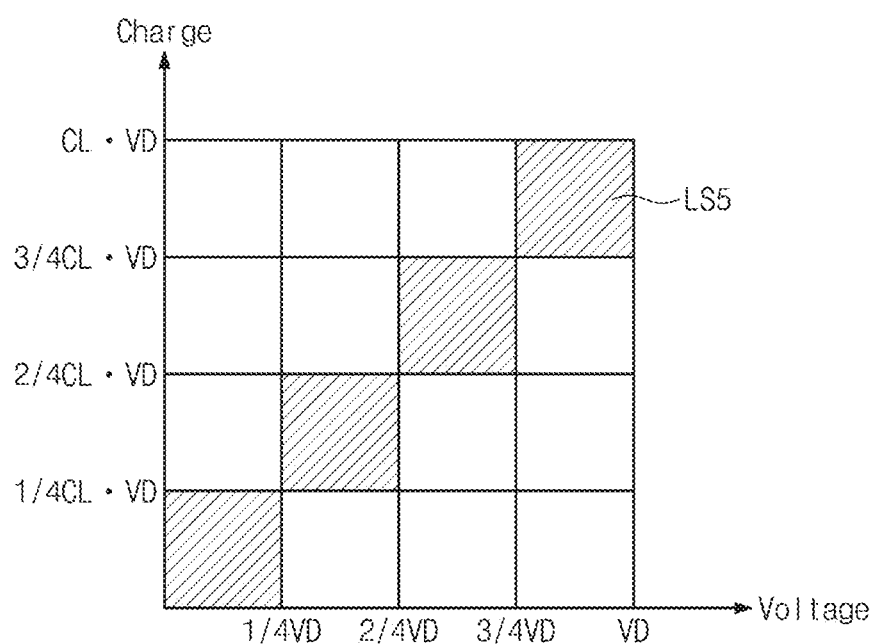
FIG. 8D is a view showing a sum of a loss amount of electric charges in the transmission touch line due to the touch driving signal of FIG. 8A and the amount of the electric charges discharged from the load capacitor according to some exemplary embodiments.

FIG. 8A is a view showing a waveform of a touch driving signal during a reference period according to some exemplary embodiments. FIG. 8B is a view showing a loss amount of electric charges in a transmission touch line due to the touch driving signal of FIG. 8A as a function of a charge amount of a load capacitor according to some exemplary embodiments. FIG. 8C is a view showing an amount of electric charges discharged from the load capacitor due to the touch driving signal of FIG. 8A according to some exemplary embodiments. FIG. 8D is a view showing a sum of a loss amount of electric charges in the transmission touch line due to the touch driving signal of FIG. 8A and the amount of the electric charges discharged from the load capacitor according to some exemplary embodiments.

The touch driving signal SG2 during a reference period PR shown in FIG. 8A may have substantially the same waveform as that of the second touch driving signal SG2 during the fourth period PR4 to the seventh period PR7 shown in FIG. 6. In FIGS. 8B to 8D, "CL" denotes the capacitance of the second load capacitor CL2.

Referring to FIGS. 4, 6, 8A, and 8B, since the second touch driving signal SG2 has a voltage level of VD/4 (e.g., the second level V2) and provides electric charges corresponding to "CL·VD/4" during the fourth period PR4, the second transmission touch line TX2 consumes an energy corresponding to "CL·VD2/16." Only an energy corresponding to "CL·VD2/32" is stored in the second load capacitor CL2, and the other energy corresponding to "CL·VD2/32" is lost due to a line resistance or the like of the second transmission touch line TX2. Similarly, during each of the fifth to seventh periods PR5 to PR7, only the energy corresponding to "CL·VD2/32" is stored in the second load capacitor CL2, and the other energy corresponding to "CL·VD2/32" is lost due to a line resistance or the like of the second transmission touch line TX2. In FIG. 8B, an electric charge loss amount LS1 in the second transmission touch line TX2 is "CL·VD2/8", and an energy LS2 stored in the second load capacitor CL2 is "CL·VD2/2."

Referring to FIGS. 4, 6, 8A, and 8C, the energy corresponding to "CL·VD2/32" stored in the second load capacitor CL2 during the fourth period PR4 may be discharged through the ground. Similarly, the energy corresponding to "CL·VD2/32" may be discharged during each of the fifth to seventh periods PR5 to PR7. The energy corresponding to "CL·VD2/16" may be recycled through the capacitor devices CAP1 and CAP2 during the fifth period PR5. The energy corresponding to "6CL·VD2/16" may be recycled through the capacitor devices CAP1 and CAP2 during the fifth to seventh periods PR5 to PR7. In FIG. 8C, an energy LS3 discharged from the second load capacitor CL2 is "CL·VD2/8", and an energy LS4 recycled through the capacitor devices CAP1 and CAP2 is "6CL·VD2/16."

Referring to FIGS. 4, 6, 8A, and 8D, an energy lost by applying the second touch driving signal SG2 increased by "VD/4" during each of the fourth to seventh periods PR4 to PR7 may be equal to a sum of the electric charge loss amount of the second transmission touch line TX2 and the electric charge amount discharged from the second load capacitor CL2 and may be "CL·VD2/16." A total energy LS5 lost by applying the second touch driving signal SG2 to the second transmission touch line TX2 during the reference period PR corresponds to "CL·VD2/4."

According to the display apparatus including the touch driving circuit according to various exemplary embodiments, the consumption of the energy may be reduced by about ¼ (a quarter) when compared to the display apparatus including the touch driving circuit according to the comparative example described with reference to FIGS. 7A to 7D.

Figure 9:
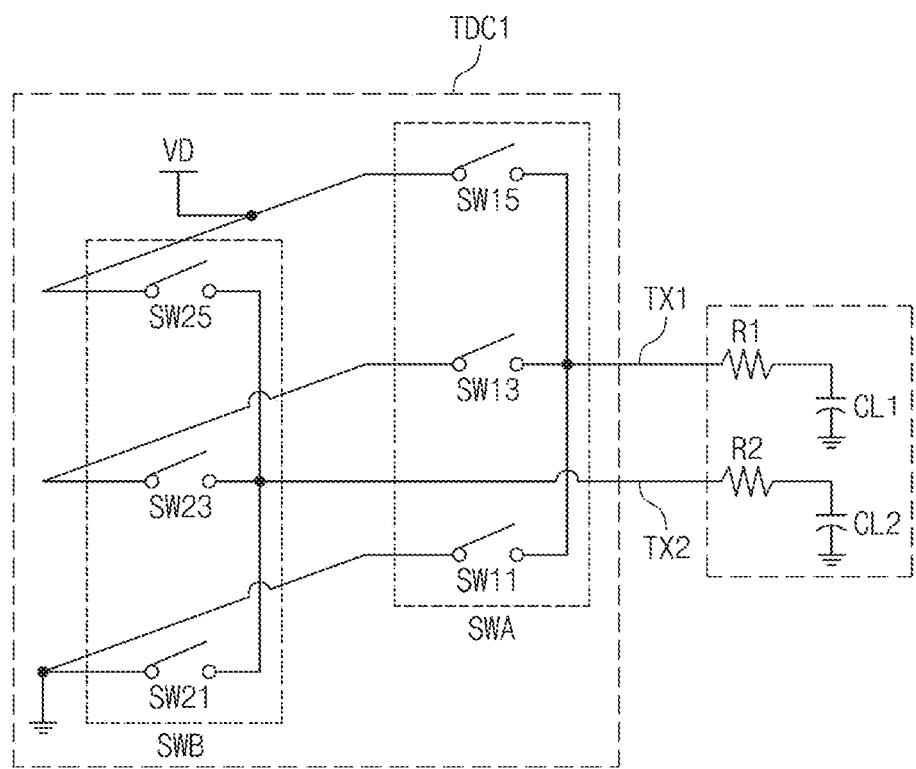
FIG. 9 is a circuit diagram showing a touch driving circuit and transmission touch lines according to some exemplary embodiments.

FIG. 9 is a circuit diagram showing a touch driving circuit and transmission touch lines according to some exemplary embodiments.

In the touch driving circuit TDC1 shown in FIG. 9, the second and fourth switch devices SW12 and SW14 are omitted from the first switch group SWA, the seventh and ninth switch devices SW22 and SW24 are omitted from the second switch group SWB, and the capacitor devices CAP1 and CAP2 are omitted when compared with the touch driving circuit TDC described with reference to FIG. 4.

The touch driving circuit TDC1 of FIG. 9 may generate a touch driving signal having three voltage levels. The touch driving circuit TDC1 may have a first level corresponding to a ground level, a second level corresponding to a level of the driving voltage VD, and a third level between the first level and the second level.

In the touch driving circuit TDC1 of FIG. 9, a first load capacitor CL1 shares electric charges with a second load capacitor CL2 during a specific period to generate the touch driving signal having three different levels.

In the case that the touch driving circuit TDC1 generates the touch driving signal having three different levels, the capacitor device shown in FIG. 4 may be omitted.

Referring to FIG. 6 again, a signal having the waveform of the first touch driving signal SG1 during the first to ninth periods PR1 to PR9 may be referred to as an "in-phase signal," and a signal having the waveform of the second touch driving signal SG2 during the first to ninth periods PR1 to PR9 may be referred to as an "out-phase signal." The in-phase signal and the out-phase signal have opposite phases to each other and are signals delayed by half a period.

As shown in FIG. 3, the transmission touch lines TX1 to TX5 of the touch sensing unit TS are provided in a plural number, and the transmission touch lines TX1 to TX5 may be substantially simultaneously driven. In a case that the transmission touch lines TX1 to TX5 are substantially simultaneously driven instead of being sequentially driven, the touch driving signals applied to the transmission touch lines TX1 to TX5 are to be distinguished from each other. The touch driving signal includes the in-phase signal and the out-phase signal, which are periodically mixed with each other, and thus, the touch driving signal may be distinguished from other touch driving signals.

Since the transmission touch lines TX1 to TX5 are substantially simultaneously driven, a capacitance of capacitors formed by the transmission touch lines TX1 to TX5 and the sensing touch lines RX1 to RX4 increases, and thus, a sensitivity of the touch sensing unit T5 may be improved.

Among the transmission touch lines TX1 to TX5, some transmission touch lines are applied with the in-phase signal, and the other transmission touch lines are applied with the out-phase signal. In this case, the number of the transmission touch lines applied with the in-phase signal may be different from the number of the transmission touch lines applied with the out-phase signal.

Referring to the fifth period PR5 of FIG. 6 by way of example, in the case that the number of the transmission touch lines applied with the in-phase signal is greater than the number of the transmission touch lines applied with the out-phase signal, a voltage level formed by the first and second transmission touch lines TX1 and TX2 sharing the electric charges during the fifth period PR5 of FIG. 6 may be greater than the third level V3. As an example, in the case that the first to third transmission touch lines TX1 to TX3 are applied with the in-phase signal among the transmission touch lines TX1 to TX5 of FIG. 3 and the fourth and fifth transmission touch lines TX4 and TX5 are applied with the out-phase signal among the transmission touch lines TX1 to TX5 of FIG. 3, a voltage level formed by the first to fifth transmission touch lines TX1 to TX5 sharing the electric charges during the fifth period PR5 may be greater than the third level V3.

On the contrary, in the case that the number of the transmission touch lines applied with the in-phase signal is smaller than the number of the transmission touch lines applied with the out-phase signal, a voltage level formed by the first and second transmission touch lines TX1 and TX2 sharing the electric charges during the fifth period PR5 of FIG. 6 may be smaller than the third level V3. As an example, in the case that the first and second transmission touch lines TX1 and TX2 are applied with the in-phase signal among the transmission touch lines TX1 to TX5 of FIG. 3 and the third to fifth transmission touch lines TX3 to TX5 are applied with the out-phase signal among the transmission touch lines TX1 to TX5 of FIG. 3, the voltage level formed by the first to fifth transmission touch lines TX1 to TX5 sharing the electric charges during the fifth period PR5 may be smaller than the third level V3.

As described above, the voltage level of the first transmission touch line TX1 may be different from the voltage level of the second transmission touch line TX2 in the periods each in which the first transmission touch line TX1 shares the electric charges with the second transmission touch line TX2 due to the difference in number between the transmission touch lines to which the in-phase signal is applied and the transmission touch lines to which the out-phase signal is applied.

Figure 10:
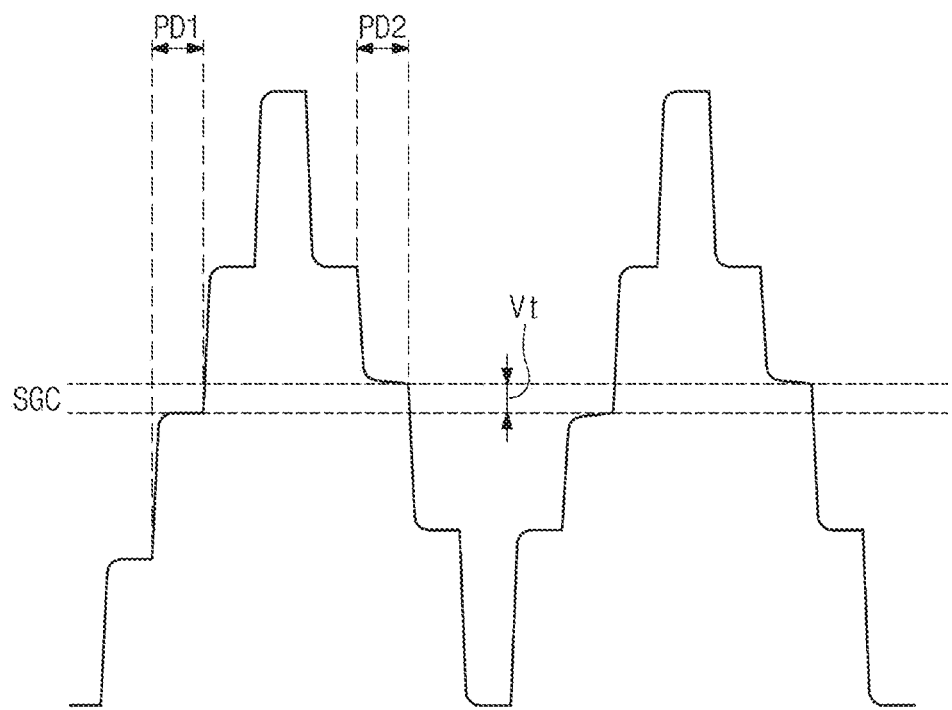
FIG. 10 is a waveform diagram showing a waveform of a touch driving signal according to according to some exemplary embodiments.

FIG. 10 is a waveform diagram showing a waveform of a touch driving signal according to according to some exemplary embodiments.

Referring to FIG. 10, there is a first difference Vt between a voltage level of a first period PD1, in which a first transmission touch line TX1 of a touch driving signal SGC shares electric charges with a second transmission touch line TX2, and a voltage level of a second period PD2.

Figure 11:
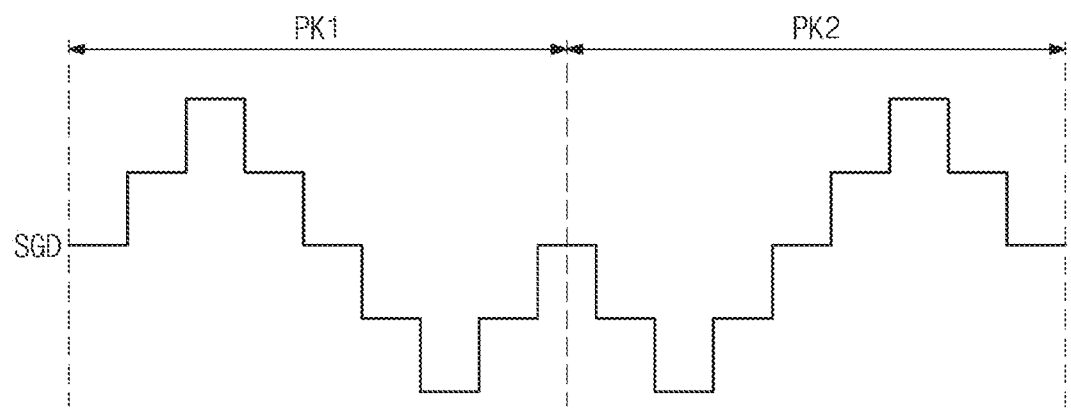
FIG. 11 is a waveform diagram showing a waveform of a touch driving signal according to according to some exemplary embodiments.

FIG. 11 is a waveform diagram showing a waveform of a touch driving signal according to according to some exemplary embodiments.

A touch driving signal SGD according to some exemplary embodiments may have opposite phases to each other during different phase periods from each other.

The touch driving signal SGD has an in-phase signal during a first phase period PK1, and the touch driving signal SGD has an out-phase signal during a second phase period PK2.

The touch driving signal SGD shown in FIG. 11 may be applied to each of the first and second touch driving signals SG1 and SG2 described with reference to FIG. 6.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display apparatus comprising:
   a display panel;
   a touch sensing unit disposed on the display panel, the touch sensing unit comprising a first transmission touch line and a second transmission touch line spaced apart from the first transmission touch line; and
   a touch driving circuit configured to:
     apply a first touch driving signal to the first transmission touch line; and
     apply a second touch driving signal to the second transmission touch line,
   wherein the touch driving circuit comprises:
     a first switch group comprising a first sharing switch device of which one end is connected to the first transmission touch line; and
     a second switch group comprising a second sharing switch device of which one end is connected to the second transmission touch line and another end is connected to another end of the first sharing switch device,
   wherein the first touch driving signal has a first voltage level during a first period, and the second touch driving signal has a second voltage level different from the first voltage level during the first period, and
   wherein the touch driving circuit is configured to turn on the first sharing switch device and the second sharing switch device during a second period after the first period such that the first touch driving signal and the second touch driving signal have a voltage level between the first voltage level and the second voltage level.

2. The display apparatus of claim 1, wherein the first sharing switch device and the second sharing switch device are turned off during the first period.

3. The display apparatus of claim 1, wherein:
the first switch group further comprises:
- a first upper switch device comprising one end connected to the first transmission touch line; and
- a first lower switch device comprising one end connected to the first transmission touch line; and the touch driving circuit further comprises:
- a first capacitor device comprising one electrode connected to another end of the first lower switch device; and
- a second capacitor device comprising one electrode connected to another end of the first upper switch device.

4. The display apparatus of claim 3, wherein the second switch group further comprises:
- a second upper switch device comprising one end connected to the second transmission touch line; and
- a second lower switch device comprising one end connected to the second transmission touch line, another end of the second lower switch device is connected to the one electrode of the first capacitor device, and another end of the second upper switch device is connected to the one electrode of the second capacitor device.

5. The display apparatus of claim 4, wherein:
the first switch group further comprises:
- a first ground switch device comprising one end connected to the first transmission touch line and another end connected to a ground; and
- a first driving switch device comprising one end connected to the first transmission touch line and another end configured to receive a driving voltage; and wherein the second switch group further comprises:
- a second ground switch device comprising one end connected to the second transmission touch line and another end connected to a ground; and
- a second driving switch device comprising one end connected to the second transmission touch line and another end configured to receive the driving voltage.

6. The display apparatus of claim 5, wherein the touch driving circuit is configured to:
- turn on the first ground switch device, the first lower switch device, the first sharing switch device, the first upper switch device, and the first driving switch device sequentially or in reverse order; and
- turn on the second ground switch device, the second lower switch device, the second sharing switch device, the second upper switch device, and the second driving switch device sequentially or in reverse order.

7. The display apparatus of claim 1, wherein:
the first switch group further comprises:
- a first ground switch device comprising one end connected to the first transmission touch line and another end connected to a ground; and
- a first driving switch device comprising one end connected to the first transmission touch line and another end configured to receive a driving voltage; and wherein the second switch group further comprises:
- a second ground switch device comprising one end connected to the second transmission touch line and another end connected to a ground; and
- a second driving switch device comprising one end connected to the second transmission touch line and another end configured to receive the driving voltage.

8. The display apparatus of claim 1, wherein the first touch driving signal and the second touch driving signal have different phases from each other during a specific period.

9. The display apparatus of claim 1, wherein the first touch driving signal has a first phase during a first phase period and has a second phase different from the first phase during a second phase period different from the first phase period.

10. The display apparatus of claim 1, wherein the touch sensing unit further comprises sensing touch lines electrically insulated from the first and second transmission touch lines.

11. The display apparatus of claim 1, wherein:
- the touch driving circuit is configured to receive a driving voltage and a ground voltage; and
- each of the first and second touch driving signals sequentially increases or decreases between the ground voltage and the driving voltage.

12. A display apparatus comprising:
a display panel;
a touch sensing unit disposed on the display panel, the touch sensing unit comprising a transmission touch line; and
a touch driving circuit configured to:
- receive a driving voltage and a ground voltage; and
- apply a touch driving signal to the transmission touch line, wherein the touch driving circuit comprises:
- a switch group comprising switch devices, the switch devices comprising first ends connected to the transmission touch line; and
- capacitor devices each being connected to second ends of some switch devices of the switch devices, and wherein the touch driving signal has N voltage levels, a number of the capacitor devices is N−3, and "N" is a natural number greater than or equal to 4.

13. The display apparatus of claim 12, wherein the touch driving signal sequentially increases or decreases between the ground voltage and the driving voltage.

14. The display apparatus of claim 12, wherein a number of the switch devices is N.

15. The display apparatus of claim 12, wherein "N" is 4.

16. A display apparatus comprising:
a display panel;
a touch sensing unit disposed on the display panel, the touch sensing unit comprising a first transmission touch line and a second transmission touch line spaced apart from the first transmission touch line; and
a touch driving circuit configured to:
- apply a first touch driving signal to the first transmission touch line; and
- apply a second touch driving signal to the second transmission touch line, wherein the first touch driving signal and the second touch driving signal have first to n-th voltage levels that sequentially increase, "n" being an odd number greater than or equal to 3, wherein each of the first touch driving signal and the second touch driving signal has a reference voltage level that is one of the first to n-th voltage level during a first period, wherein the first touch driving signal has a voltage level higher than the reference voltage level during a second period immediately after the first period, wherein the second touch driving signal has a voltage level lower than the reference voltage level during the second period after the first period, and wherein voltage levels of the first touch driving signal and the second touch driving signal are simultaneously changed during the second period.

17. A display apparatus comprising:

a display panel;

a touch sensing unit disposed on the display panel, the touch sensing unit comprising a first transmission touch line and a second transmission touch line spaced apart from the first transmission touch line; and a touch driving circuit configured to:
- apply a first touch driving signal to the first transmission touch line; and
- apply a second touch driving signal to the second transmission touch line, wherein:

the first touch driving signal and the second touch driving signal have first to n-th voltage levels that sequentially increase, "n" being an odd number greater than or equal to 3;

each of the first touch driving signal and the second touch driving signal has an $((n+1)/2)$-th voltage level during a first period;

the first touch driving signal has an $((n+3)/2)$-th voltage level during a second period after the first period;

the second touch driving signal has an $((n-1)/2)$-th voltage level during the second period after the first period;

the first touch driving signal has an $((n+5)/2)$-th voltage level during a third period after the second period; and the second touch driving signal has an $((n-3)/2)$-th voltage level during the third period after the second period.

18. The display apparatus of claim 17, wherein:

"n" is 5;

the first touch driving signal has an $((n+3)/2)$-th voltage level during a fourth period after the third period;

the second touch driving signal has an $((n-1)/2)$-th voltage level during the fourth period after the third period; and each of the first touch driving signal and the second touch driving signal has an $((n+1)/2)$-th voltage level during a fifth period after the fourth period.

19. The display apparatus of claim 18, wherein:

the first touch driving signal has an $((n-1)/2)$-th voltage level during a sixth period after the fifth period;

the second touch driving signal has an $((n+3)/2)$-th voltage level during the sixth period after the fifth period;

the first touch driving signal has an $((n-3)/2)$-th voltage level during a seventh period after the sixth period;

the second touch driving signal has an $((n+5)/2)$-th voltage level during the seventh period after the sixth period;

the first touch driving signal has an $((n-1)/2)$-th voltage level during an eighth period after the seventh period;

the second touch driving signal has an $((n+3)/2)$-th voltage level during the eighth period after the seventh period;

the first touch driving signal has an $((n+1)/2)$-th voltage level during a ninth period after the eighth period; and the second touch driving signal has an $((n+3)/2)$-th voltage level during the ninth period after the eighth period.

* * * * *